(12) United States Patent
Okamoto et al.

(10) Patent No.: US 6,285,924 B1
(45) Date of Patent: Sep. 4, 2001

(54) ON-VEHICLE INPUT AND OUTPUT APPARATUS

(75) Inventors: Terumi Okamoto; Katsushi Sakai; Katsumi Oomuro, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/362,044

(22) Filed: Jul. 28, 1999

(30) Foreign Application Priority Data

Dec. 25, 1998 (JP) .................................................. 10-371394

(51) Int. Cl.⁷ ........................................................ G06F 1/00
(52) U.S. Cl. .............................. 701/1; 701/36; 701/211; 704/272; 345/326
(58) Field of Search ................................ 701/1, 36, 211; 704/272; 340/996; 345/326, 358

(56) References Cited

U.S. PATENT DOCUMENTS

| | | | |
|---|---|---|---|
| 4,850,930 | * 7/1989 | Sato et al. | 446/175 |
| 5,214,707 | * 5/1993 | Fujimoto et al. | 704/275 |
| 5,983,186 | * 11/1999 | Miyazawa et al. | 704/275 |
| 5,983,188 | * 11/1999 | Roessle | 704/275 |
| 6,020,654 | * 2/2000 | Chutorash | 307/10.1 |
| 6,149,490 | * 11/2000 | Hampton et al. | 446/353 |

OTHER PUBLICATIONS

Awad, S.; Voice Technology in the Instrumentation of the Automobile, IEEE—Trans. on Instrumentation and Measurement; vol. 37, No. 4; Dec. 1998; pp. 586–590.*

* cited by examiner

Primary Examiner—Michael J. Zanelli
(74) Attorney, Agent, or Firm—Staas & Halsey LLP

(57) ABSTRACT

An on-vehicle input and output apparatus having a head portion and a body portion, has an information input unit for receiving input information in an on-vehicle environment, an information interpreter unit for interpreting the input information received through the information input unit to generate output information, and an information output unit for outputting the output information generated in the information interpreter unit.

47 Claims, 39 Drawing Sheets

ON-VEHICLE INPUT AND OUTPUT APPARATUS

BACKGROUND OF THE INVENTION

1. Field of the Invention

The present invention relates to an on-vehicle input and output apparatus having a head portion and a body portion.

2. Description of the Prior Art

Hitherto, in the event that a driver of a vehicle and a fellow passenger wish to obtain information as to a state of condition of the vehicle and circumstances, usually, there is adopted such a way that they look at an indicator provided on the vehicle through their eyes to directly read the information. Here, as an example of such an indicator, there will be explained a navigation system which is loaded on a vehicle. Recently, an on-vehicle navigation system comes into wide use. And as the recent information processing technology advances, such a navigation system is drastically improved in its performance, and on the other hand, it becomes complicated and diversifies in its operation and its output content. However, as to an operation of such a complicated system, according to the conventional way, the operation is performed in such a manner that a menu is displayed on a screen to perform an input on a touch panel basis, or to perform a designate by a cursor. Or alternatively the operation is performed by the use of a number of operational switches provided on remote controller. However, as far as a driver looks at those items, the driver is obliged to take one's eyes off and thus it is not preferable for driving. In view of the foregoing, recently, there has been proposed a product capable of inputting and outputting messages through voice. According to such a product, part of a number of functions is arranged so as to permit a voice input, and there is permitted a voice synthesis output associated with a menu on a screen. However, such a navigation system permitting voice input and output is a mineral (i.e., inanimate) system loaded on a vehicle.

The conventional on-vehicle information equipment having a voice input and output function, for example, the above-mentioned navigation system, is stubbornly a mineral subject having an image of an apparatus or a device, and thus it is unnatural for a user (a driver and a fellow passenger) to perform an operation through a conversation and involves a feeling of wrongness.

SUMMARY OF THE INVENTION

In view of the foregoing, it is an object of the present invention to provide an on-vehicle input and output apparatus capable of defining an enormous amount of speech of a conversation type without a feeling of wrongness (i.e., unpleasantness) for an operator (a driver).

To achieve the above-mentioned objects, the present invention provides an on-vehicle input and output apparatus having a head portion and a body portion, comprising:

an information input unit for receiving input information in an on-vehicle environment;

an information interpreter unit for interpreting the input information received through said information input unit to generate output information; and an information output unit for outputting the output information generated in said information interpreter unit.

The on-vehicle input and output apparatus has a head portion and a body portion, typically, an appearance like a doll or a stuffed toy. This feature makes it possible to reduce a feeling of wrongness as compared with a mineral apparatus.

In the on-vehicle input and output apparatus according to the present invention as mentioned above, it is preferable that said information output unit has a voice output apparatus for outputting a voice, and outputs the output information through said voice output apparatus in form of voice.

It is preferable that said information output unit has a head motion mechanism for moving said head portion with respect to said body portion, and outputs the output information in such a manner that said head motion mechanism is used to move said head portion.

Further, it is preferable that said information output unit has right and left arm portions, and an arm motion mechanism for moving said right and left arm portions with respect to said body portion, and outputs the output information in such a manner that said arm motion mechanism is used to move said right and left arm portions.

Furthermore, it is preferable that said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

Here, the above-referenced "equipment" implies, for example, a car interior temperature control equipment, a car interior lighting equipment, a head light equipment, a car interior audio equipment, and so on. In this case, the output information implies information of an instruction of increasing or decreasing a temperature, information of an instruction of turning on or turning off a car interior light or a head light, information of an instruction of turning on or turning off a car interior audio equipment, information of an instruction of volume up or volume down, and so on.

Further, in the above-mentioned on-vehicle input and output apparatus according to the present invention, it is preferable that said information input unit has a microphone for picking up a voice, and said information interpreter unit has a voice recognition apparatus for recognizing a voice, and recognizes the voice to generate the output information.

It is preferable that said information input unit has a sensor for detecting a predetermined environment condition in an on-vehicle environment, and said information interpreter unit interprets the environment condition detected by said sensor to generate the output information.

Further, it is preferable that said information input unit has a receiver apparatus for receiving information representative of a predetermined physical amount indicative of a state of a car, the predetermined physical amount being detected by a sensor set up in the car, and said information interpreter unit interprets the information received by said receiver apparatus to generate the output information.

Here, the above-referenced sensors include various types of sensors for detecting, for example, the car driving speed, the present fuel efficiency (driving distance/fuel consumption amount), the rest of fuel and so on.

The on-vehicle input and output apparatus according to the present invention as mentioned above includes various types of aspects as set forth below.

(1) the information input unit has a microphone for picking up a voice, the information interpreter unit interprets to receive a greeting through a voice recognition and generates output information representative of a responsive greeting to the greeting, and the information output unit outputs the output information in form of a voice or both a voice and a motion.

(2) the information input unit has an acceleration sensor or a slope sensor, the information interpreter unit interprets it as a quick acceleration, an emergency brake or an emergency handle, and generates an associated output information, and the information output unit outputs the output information in form of a voice or both a voice and a motion.

(3) the information input unit has a terrestrial magnetism sensor and a microphone for picking up a voice, the information interpreter unit interprets an inquiry as to a direction of movement of a car through a voice recognition and generates output information representative of the direction of movement of the car, and the information output unit outputs the output information in form of a voice or both a voice and a motion.

(4) the information input unit has a microphone for picking up a voice, the information interpreter unit interprets a car head light control instruction through a voice recognition and generates an associated output information, and the information output unit informs in form of a voice or both a voice and a motion of a matter that a head light is controlled, and transmits output information for a head light control to a head light control equipment.

(5) the information input unit receives car speed information or has a vibration sensor, and in addition has a photo detector for detecting luminance, the information interpreter unit interprets that a car is within a tunnel or out of the tunnel and generates an associated output information, and the information output unit outputs the output information in form of a voice or both a voice and a motion.

(6) the information input unit receives car speed information or has a vibration sensor, the information interpreter unit interprets that a car is in a state of a continuous driving over a predetermined time and generates an associated output information, and the information output unit outputs the output information in form of a voice or both a voice and a motion.

(7) the information input unit has a microphone for picking up a voice, and the information input unit receives car speed information or has a vibration sensor, the information interpreter unit interprets that a car is continuously driven over a predetermined time while no voice is inputted, and generates an associated output information, and the information output unit outputs the output information in form of a voice or both a voice and a motion.

(8) the information input unit has an odor sensor, the information interpreter unit interprets driving under the influence of liquor and generates an associated output information, and the information output unit outputs the output information in form of a voice or both a voice and a motion.

(9) the information input unit has a vibration sensor, the information interpreter unit interprets that a car is in motion on a bad road and generates an associated output information, and the information output unit outputs the output information in form of a voice or both a voice and a motion.

(10) the information input unit has a temperature sensor or a humidity sensor, and a microphone for picking up a voice, the information interpreter unit interprets inquiries as to temperature or humidity of a car interior through a voice recognition, and generates an output information representative of temperature or humidity of the car interior, and the information output unit outputs the output information in form of a voice or both a voice and a motion.

(11) the information input unit has a temperature sensor and a microphone for picking up a voice, the information interpreter unit determines in accordance with information from the temperature sensor as to whether a temperature of a car interior is within a suitable temperature limit, and when it is determined that the temperature of the car interior is out of the suitable temperature limit, and when a n agreement of a temperature control is interpreted through a voice recognition, the information interpreter unit generates an associated output information, and the information output unit informs in form of a voice or both a voice and a motion of a matter that an air-conditioning control is performed, and transmits output information for an air-conditioning control to an on-vehicle air-conditioning control equipment.

(12) the information input unit has a microphone for picking up a voice, the information interpreter unit interprets effective temperature information through a voice recognition and generates an associated output information, and the information output unit informs in form of a voice or both a voice and a motion of a matter that an air-conditioning control is performed, and transmits output information for an air-conditioning control to an on-vehicle air-conditioning control equipment.

(13) the information input unit has a microphone for picking up a voice, the information interpreter unit interprets auditory sense volume information through a voice recognition and generates an associated output information, and the information output unit informs in form of a voice or both a voice and a motion of a matter that a volume control for an on-vehicle audio equipment is performed, and transmits output information for a volume control for the on-vehicle audio equipment to the on-vehicle audio equipment.

(14) the information input unit has a microphone for picking up a voice, the information interpreter unit interprets an instruction as to a car interior lighting through a voice recognition and generates an associated output information, and the information output unit informs in form of a voice or both a voice and a motion of a matter that a control for a car interior lighting equipment is performed, and transmits output information for a car interior lighting equipment control to the car interior lighting equipment.

(15) the on-vehicle input and output apparatus incorporates therein a portable telephone or is connected to the portable telephone, the information input unit has a microphone for picking up a voice, the information interpreter unit interprets an instruction as to a portable telephone control through a voice recognition and generates an output information for the portable telephone control, and the information output unit transmits output information for the portable telephone control to the portable telephone.

(16) the information input unit has a microphone for picking up a voice, and receives information detected by a sensor for detecting a predetermined physical amount indicative of a state of a car, the sensor being set up in the car, the information interpreter unit interprets an inquiry as to the state of the car through a voice recognition, and generates an output information representative of the state of the car responding to the inquiry, and the information output unit outputs the output information in form of a voice or both a voice and a motion.

(17) the on-vehicle input and output apparatus is connected to a car navigation system, the information input unit has a microphone for picking up a voice, and receives information obtained through the car navigation system, the information interpreter unit interprets an inquiry as to a navigation through a voice recognition, and generates an output information representative of a response to the inquiry, and the information output unit outputs the output information in form of a voice or both a voice and a motion.

(18) the car navigation system connected to the on-vehicle input and output apparatus has a function that a landmark including a voice is applied, the information interpreter unit interprets an instruction of applying the landmark through a voice recognition, and generates an output information as to a control of applying the landmark to the car navigation system, and the information interpreter unit receives an input of a voice to be associated with the landmark from the microphone, and generates an output information representative of the voice to be associated with the landmark through a voice recognition, the information output unit outputs the output information to the car navigation system.

(19) the information input unit receives speed information of a car, the information interpreter unit interprets a delay of the car, and generates an associated output information, and the information output unit outputs the output information in form of a voice or both a voice and a motion.

(20) the on-vehicle input and output apparatus has a camera, the information input unit has a microphone for picking up a voice, the information interpreter unit interprets an instruction as to a photography through a voice recognition, and generates an output information for a camera control, and the information output unit outputs the output information to the camera.

(21) the information input unit has a terrestrial magnetism sensor, the information interpreter unit interprets a turn-right, a turn-left, or a turn of a car, and generates an associated output information, and the information output unit outputs the output information in form of a voice or both a voice and a motion.

(22) the information input unit has a timer or a clock, the information interpreter unit interprets a time-up of the timer or an elapse of a predetermined time, and generates a predetermined output information, and the information output unit outputs the output information in form of a voice or both a voice and a motion.

DETAILED DESCRIPTION OF PREFERRED EMBODIMENTS

Embodiments of the present invention will be described with reference to the accompanying drawings.

Figure 1:
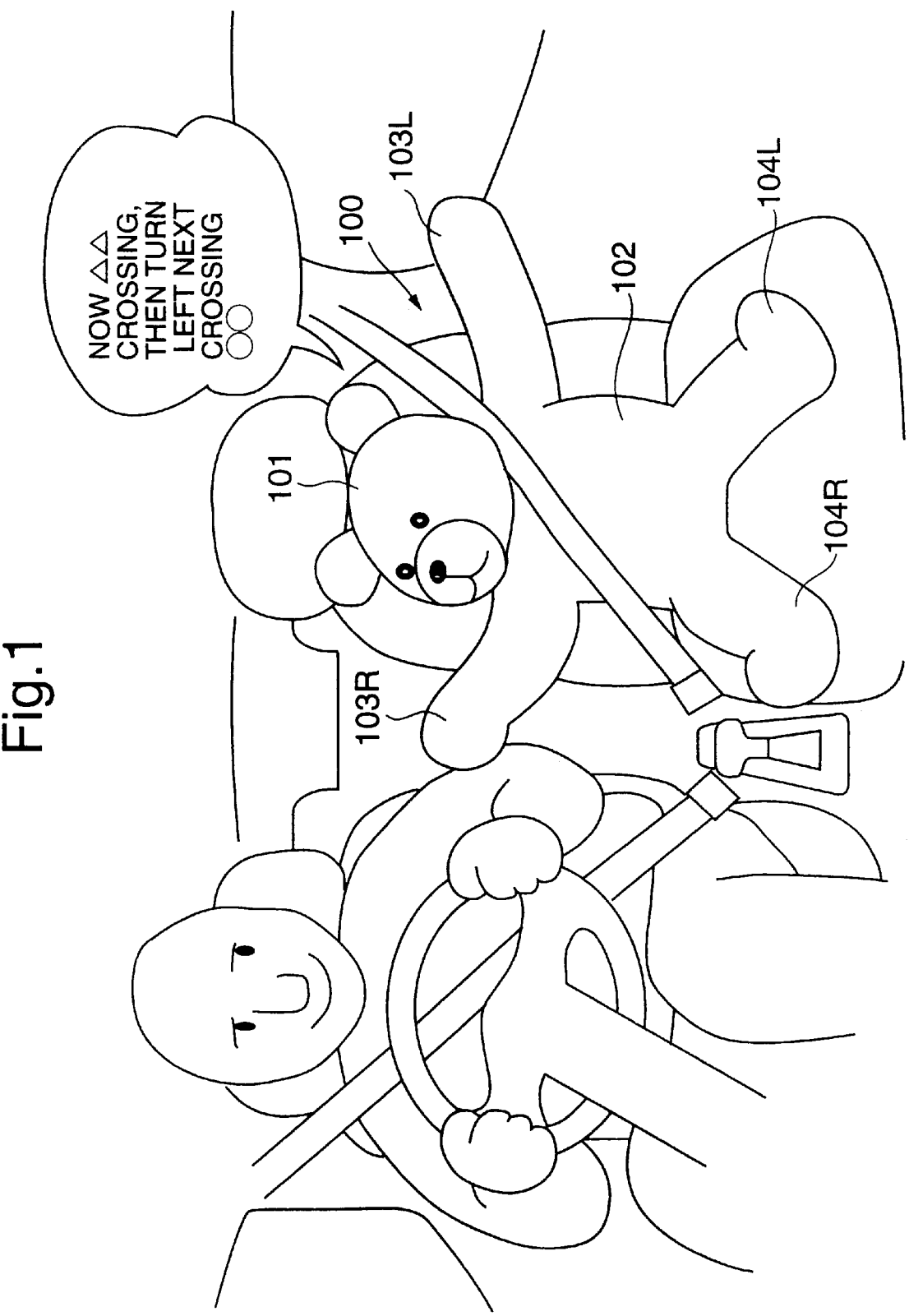
FIG. 1 is a typical illustration showing a state that an on-vehicle input and output apparatus according to the present invention is loaded on the inside of a car.
Figure 2:
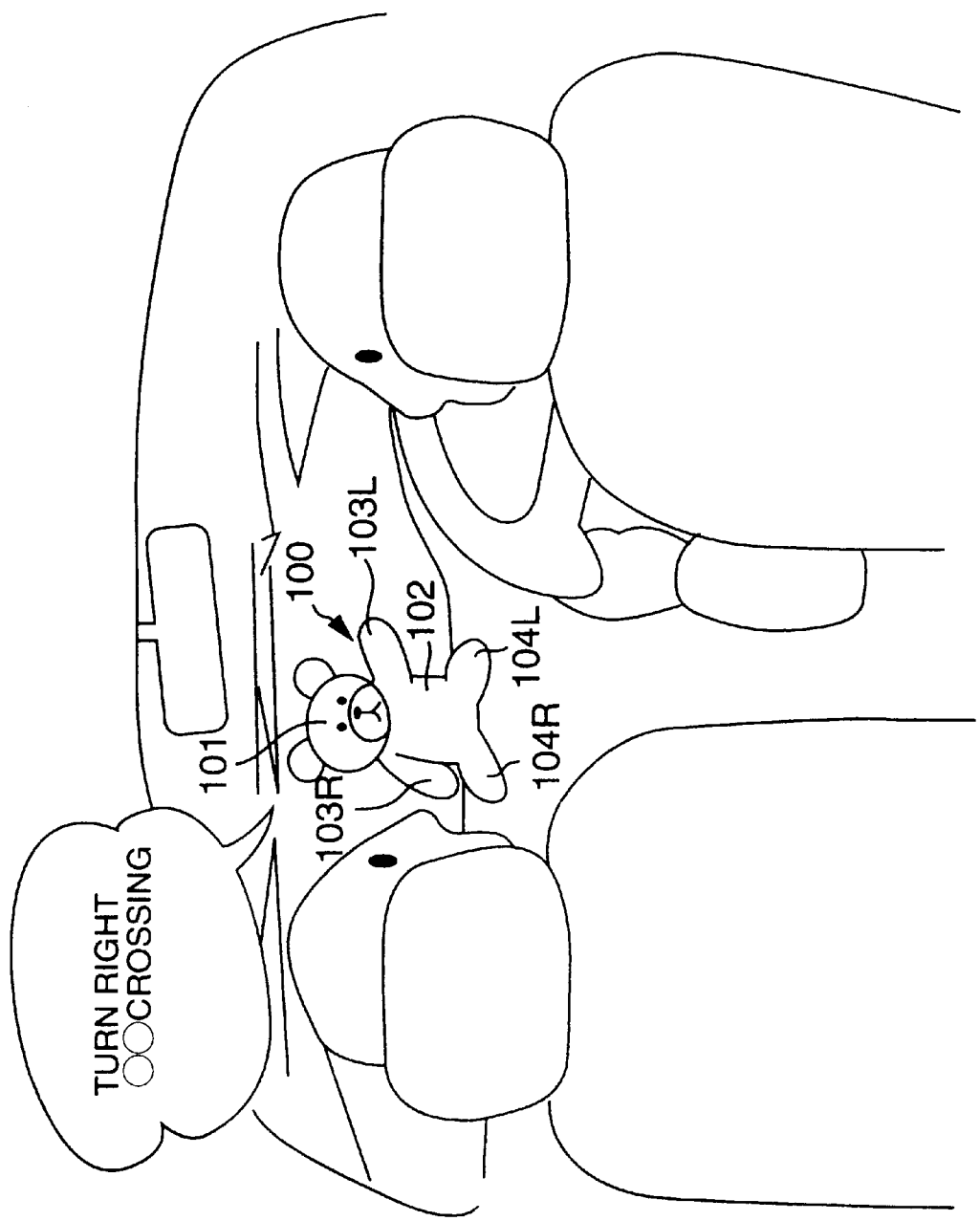
FIG. 2 is a typical illustration showing a state that an on-vehicle input and output apparatus according to the present invention is loaded on the inside of a car.

FIGS. 1 and 2 are typical illustrations each showing a state that an on-vehicle input and output apparatus according to the present invention is loaded on the inside of a car.

FIG. 1 shows a state that an on-vehicle input and output apparatus having a figure of rather a large doll or a stuffed toy is loaded on the passenger driver seat. FIG. 2 shows a state that an on-vehicle input and output apparatus having a figure of a relatively small doll or stuffed toy is loaded on the dashboard of a car.

An on-vehicle input and output apparatus according to the present invention is typically one having a figure of a doll or a stuffed toy to be loaded inside a car, as shown in FIGS. 1 and 2. Here, these doll and toy are referred to as a "doll". The doll 100 comprises, in appearance, a head portion 101, a body portion 102, a right arm 103R, a left arm 103L, a right leg 104R and a left leg 104L.

Hereinafter, there will be explained an embodiment of an on-vehicle input and output apparatus (doll) set up in the passenger seat as shown in FIG. 1.

Figure 3:
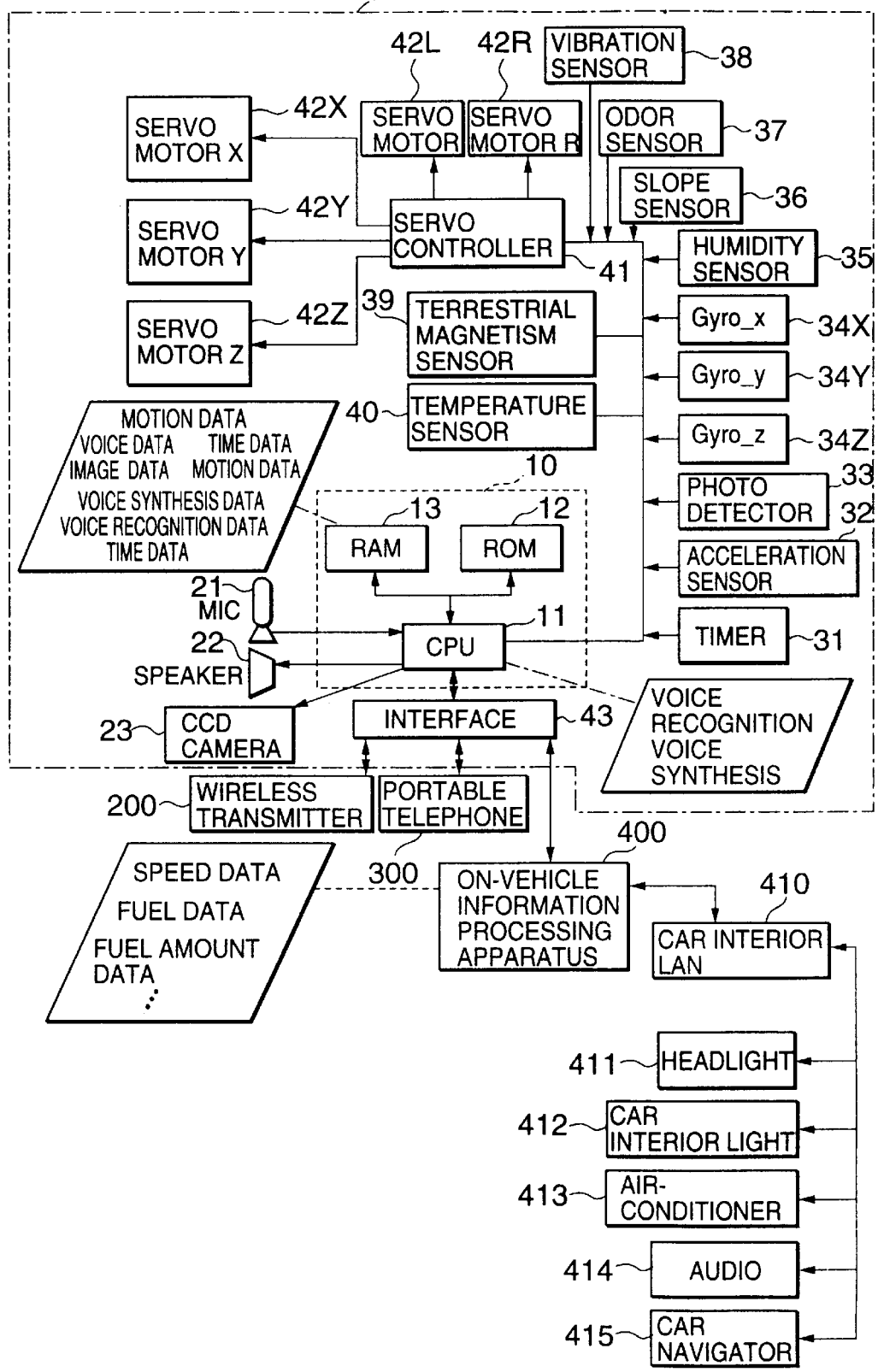
FIG. 3 is a block diagram of an on-vehicle input and output apparatus according to an embodiment of the present invention.

FIG. 3 is a block diagram of an on-vehicle input and output apparatus according to an embodiment of the present invention.

A doll or an on-vehicle input and output apparatus 100 comprises: a core portion 10 comprising a CPU 11 in which a program for various types of processing including a voice recognition processing and a voice synthesis processing is executed, a ROM 12 for storing the program to be run on the CPU 11, and a RAM 13 for storing various types of data shown in FIG. 3; a microphone 21 for picking up a voice to transfer the same to the CPU 11; a speaker 22 for outputting voice information received from the CPU 11 in the form of a voice; a camera 23 for performing a photography under a control of the CPU 11; a timer 31; an acceleration sensor 32; a photo detector 33 for detecting luminance; gyro-sensors 34x, 34y, 34z; a humidity sensor 35 for measuring humidity of a car interior; a slope sensor 36; an odor sensor 37; a vibration sensor 38; a terrestrial magnetism sensor 39; a temperature sensor 40 for measuring temperature of a car interior; and a servo controller 41. The servo controller 41 controls three servo motors 42X, 42Y and 42Z for moving the head portion of the doll 100 and two servo motors 42L and 42R for moving the left and right arm portions of the doll, respectively, in accordance with a control signal transmitted from the CPU 11.

The doll 100 further comprises an interface circuit 43 for transferring signals between the CPU 11 and external equipment units. Here, connected to the interface circuit 43 are a wireless transmitter 200, a portable telephone 300, and an on-vehicle information processing apparatus 400. The on-vehicle information processing apparatus 400 is set up on a car on which the doll 100 is loaded. In the on-vehicle information processing apparatus 400, various sorts of data related to the state of the car, such as speed data, fuel efficiency data, fuel amount data and so on, are collected so as to distribute via the interface circuit 43 to the doll 100. The on-vehicle information processing apparatus 400 is connected via a car interior LAN (CAN: Control Area Network) to a headlight 411 of the car, a car interior light 412, an air conditioning equipment 413, an audio equipment 414 and a car navigation system 415. The on-vehicle information processing apparatus 400 controls those equipment units in accordance with the control information transmitted from the doll 100.

In the on-vehicle input and output apparatus according to the embodiment shown in FIG. 3, the information input function of the interface circuit 43, the timer 31, various types of sensors, the microphone 21 and so on, correspond to the information input unit referred to in the present invention. The combination of the hardware of the core unit 10 and various sorts of programs (software) to be run on the hardware of the core unit 10 corresponds to the information interpreter unit referred to in the present invention. And the information output function of the interface circuit 43, the servo controller 41, the servo motors 42X, 42Y, 43Z, 42L and 42R, the speaker 22, the control information transmission function and so on, correspond to the information output unit referred to in the present invention.

While FIG. 3 shows that the wireless transmitter 200 and the portable telephone 300 are separated from the doll 100, it is acceptable that those equipment units are incorporated into the doll 100. Further, while the on-vehicle information processing apparatus 400 is directly connected to the interface circuit 43, it is acceptable that the on-vehicle information processing apparatus 400 is also provided with a wireless transmitter, and communication is performed with the wireless transmitter 200 on a radio basis, so that exchange of messages with the doll 100 are carried out.

FIGS. 4(A)–4(D) are explanatory views useful for understanding motions of a doll by the servo motors shown in FIG. 3.

Figure 4A:
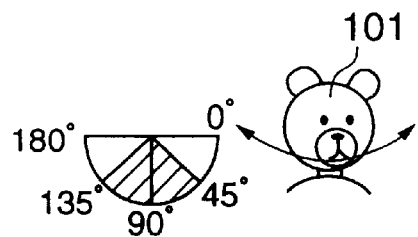
FIGS. 4(A)–4(D) are explanatory views useful for understanding motions of a doll by servo motors shown in FIG. 3.

FIG. 4(A) is a typical illustration showing a motion of the doll 100 according to the servo motor 42X. A head portion 101 of the doll 100 turns left and right by the servo motor 42X. Here, it is defined that a position of the head portion 101 where the doll 100 looks front is 90°, and positions of the head portion 101 where the doll 100 looks right left and right are 0° and 180°, respectively.

Figure 4B:
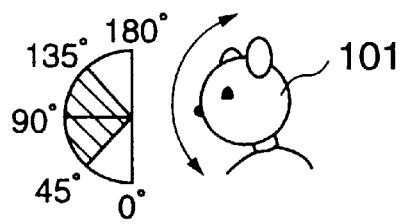

FIG. 4(B) is a typical illustration showing a motion of the doll 100 according to the servo motor 42Y. A head portion 101 of the doll 100 turns up and down by the servo motor 42Y. Here, it is defined that a position of the head portion 101 where the doll 100 looks front is 90°, and positions of the head portion 101 where the doll 100 looks right up and down are 0° and 180°, respectively.

Figure 4C:
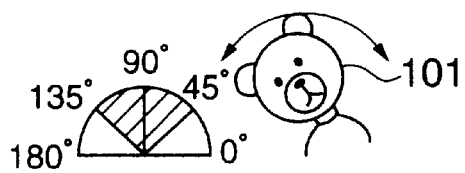

FIG. 4(C) is a typical illustration showing a motion of the doll 100 according to the servo motor 42Z. A head portion 101 of the doll 100 leans to the left and the right by the servo motor 42Z. Here, it is defined that a state that the head portion 101 is straight is 90°, and states that the head portion 101 leans to the left an the right by 90° are 0° and 180°, respectively.

Figure 4D:
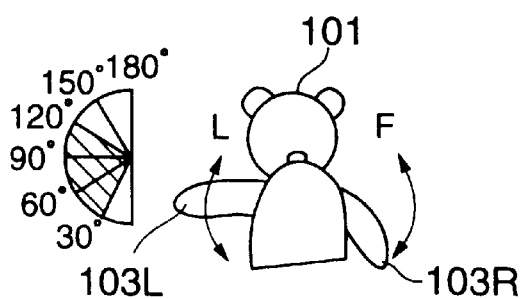

FIG. 4(D) is a typical illustration showing a motion of the doll 100 according to the servo motors 42L and 42R. The left arm 103L and the right arm 103R of the doll 100 moves up and down by the servo motors 42L and 42R, respectively. Here, it is defined that a state that the arm goes right down is 0°, and states that the arm goes right up and horizontally are 90° and 180°, respectively.

Tables 1 and 2 show various modes of motions of the doll of which the hardware structure is shown in FIG. 3.

In Table 1, "No." denotes a number applied to a motion, "Figures" denotes a number of a figure associated with the motion, "Event" denotes a keyword of the motion, "Input 1" denotes an input triggered the motion, and "Output 1" denotes an output (voice generation, motions of a doll, etc.) associated with the input. In Table 2, "No." denotes a number applied to a motion corresponding to that in Table 1, "Input 2" denotes an input expected after the "Output 1" in Table 1, and "Output 2" denotes an output (voice generation, motions of a doll, etc.) responding to the "Input 2".

Hereinafter, there will be described various modes of motions of the doll with reference to the following figures.

Figure 5:
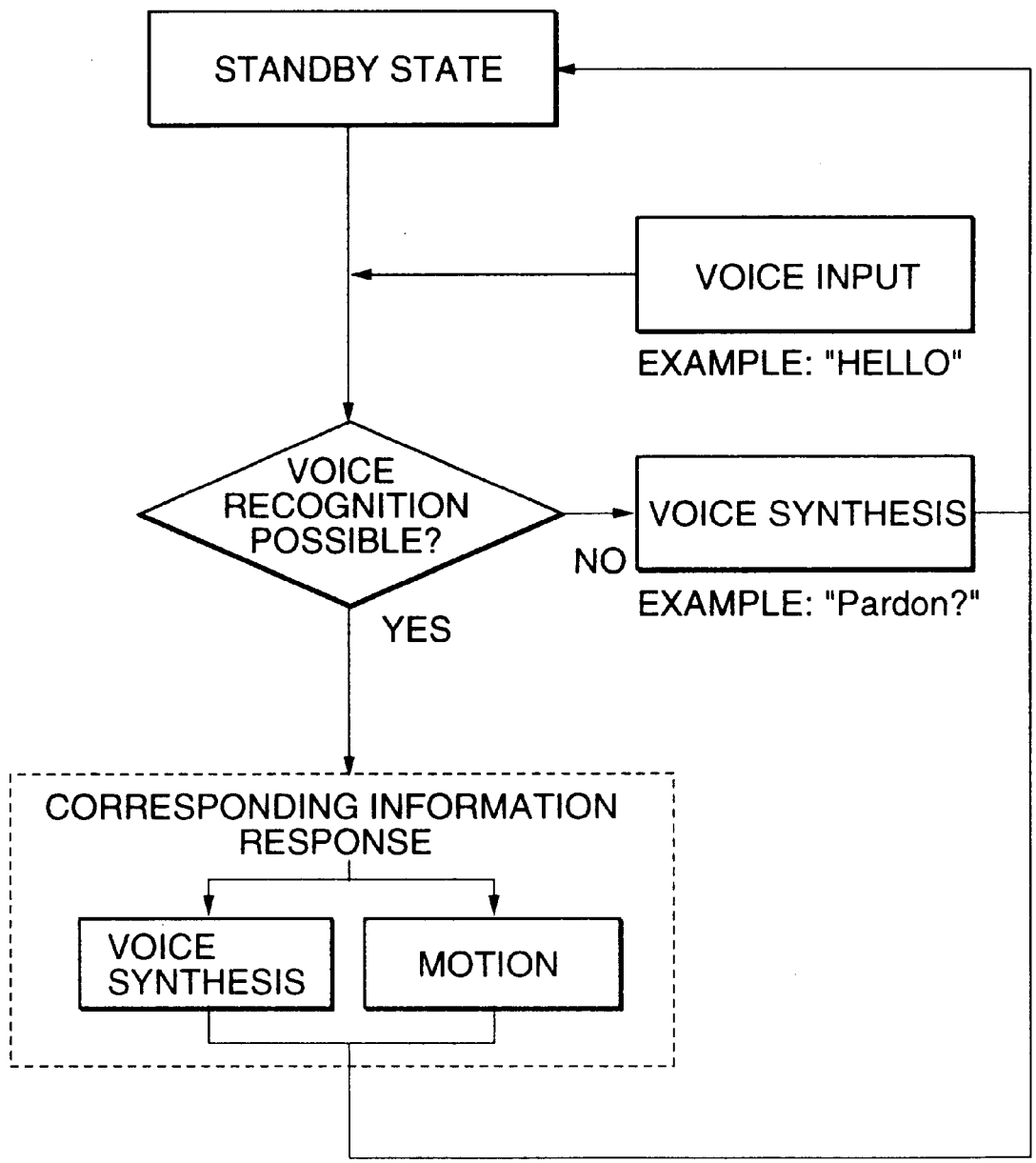
FIG. 5 is a flowchart useful for understanding a motion flow for a "greeting".

FIG. 5 is a flowchart useful for understanding a motion flow for a "greeting".

When it is in a standby state, here, it is assumed that a voice, for example, "Good morning", "Hello", "What is your name ?", "Sing a song please", or "Make a pun", is inputted. When a voice recognition ends in failure, a voice "Pardon" is synthesized and outputted, and then the process returns to the standby state. When the voice recognition is successful, information corresponding to the instruction is outputted. In case of this motion mode, the information thus outputted consists of a voice output according to the voice synthesis and a motion of the doll 100. In case of another motion mode, it is acceptable that the output information consists of only a voice output, or alternatively, it happens that the output information controls the equipment of a car via the interface circuit 43.

Figure 6A:
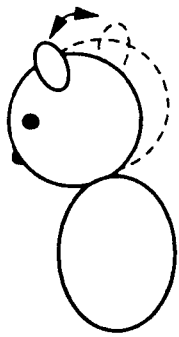
FIGS. 6(A)–6(C) are illustrations showing examples of motions of a doll in case of a "greeting".
Figure 6B:
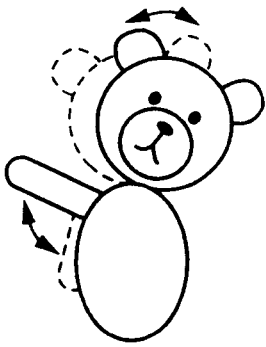
Figure 6C:

FIGS. 6(A)–6(C) are illustrations showing examples of motions of a doll in case of a "greeting".

When a voice of "Good morning" is inputted, the doll responds with "Good morning", and the head portion of the doll leans to the front as shown in FIG. 6(A).

"90, 45, 90" appearing on the column of the servo Y of "output 1" aligned with "Good morning" of the row of No. 1 in Table 1 means that the head portion 101 of the doll 100 moves from a position of 90° (looking front) shown in FIG. 4(B) to a position of 45° (turning obliquely downward), and then moves to a position of 90° (looking front) in accordance with the servo motor 42Y. The respective columns of the servos X, Y, Z, L and R are expressed on a similar fashion to that of the above-mentioned notation.

When a voice of "Hello" is inputted, the doll responds with "Hello", and the doll leans its head portion to the left and raises its right hand as shown in FIG. 6(B). "90, 45, 90" appearing on the column of the servo Z of "output 1" aligned with "Hello" of the row of No. 1 in Table 1 means that the doll leans the head portion 101 to the left, and "30, 128, 30" appearing on the column of the servo Z of "output 1" means that the doll raises its right hand.

When a voice of "What is your name?" is inputted, the doll responds "I am Mr. Smith", and the doll nods its head as shown in FIG. 6(A).

When a voice of "Sing a song please" is inputted, the doll sings a predetermined song while the doll leans its head right and left. "90, 45, 90, 135" appearing on the column of the servo Z of "output 1" aligned with "Sing" of the row of No. 1 in Table 1 means that the doll leans its head right and left. This motion is continued until the song is terminated.

Likely, when a voice of "Pun" is inputted, the doll makes a pun while the doll leans its head right and left.

In this manner, according to the present embodiment of the present invention, a doll is arranged in such a manner that the doll speaks its name, says a greeting, sings a song and makes a pun, while the doll makes motions. This feature makes it possible for a driver and fellow passenger to have friendship with the doll as if the doll lives and thereby implementing a natural conversation free from a feeling of wrongness.

Figure 7:
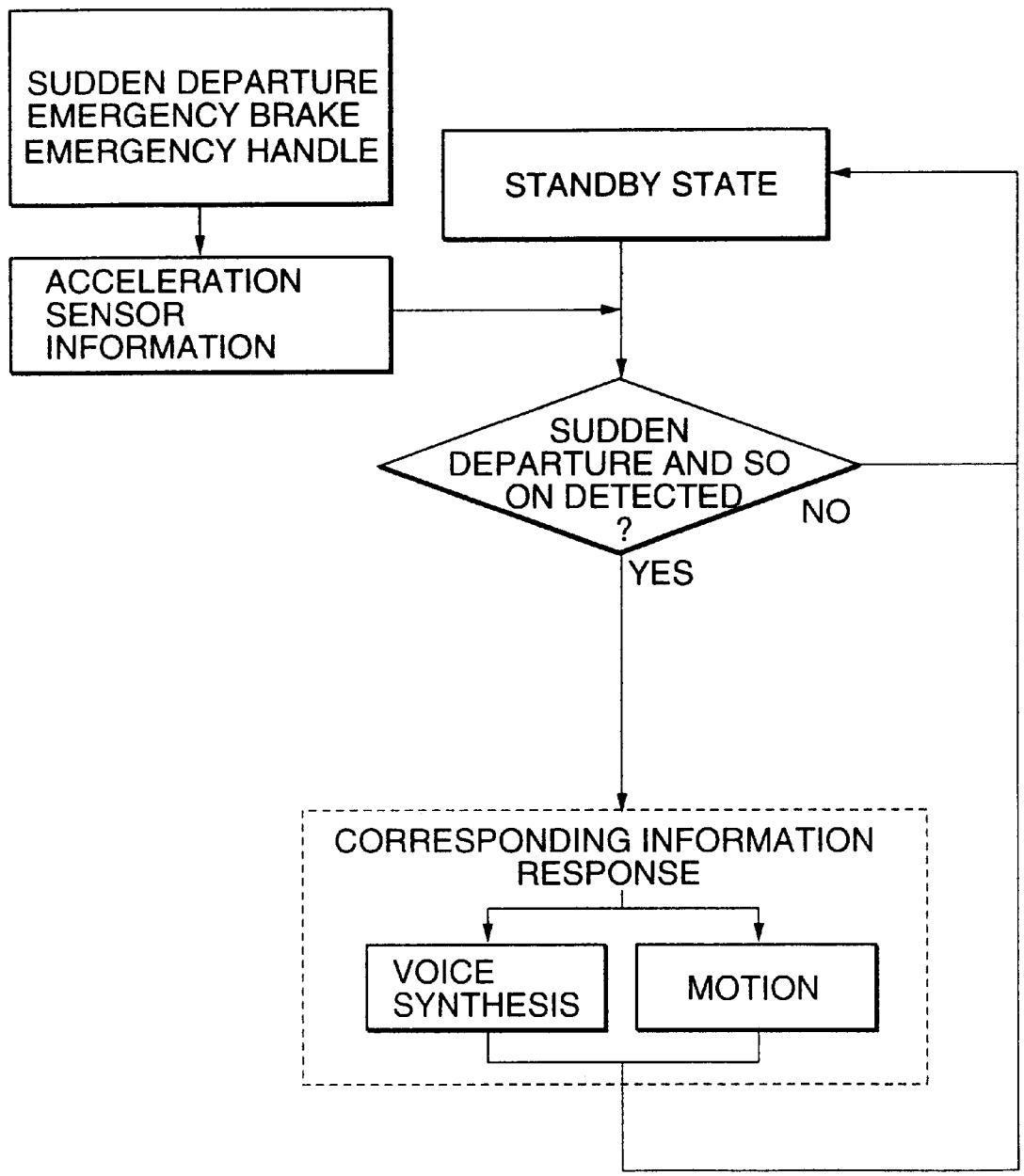
FIG. 7 is a flowchart useful for understanding a motion flow according to an input from an acceleration sensor.

FIG. 7 is a flowchart useful for understanding a motion flow according to an input from an acceleration sensor.

In the standby state, when information is inputted from an acceleration sensor, and it is determined as a sudden departure, an emergency brake or an emergency handle in accordance with the information inputted from the acceleration sensor, the corresponding response information is prepared so that the doll generates a voice and takes a motion in accordance with the response information.

Figure 8A:
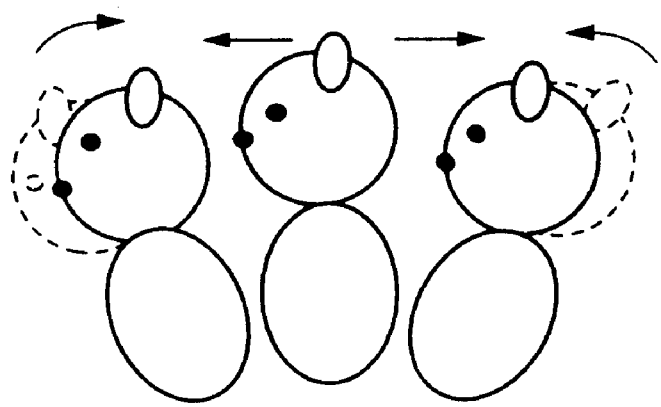
FIGS. 8(A)–8(B) are illustrations showing examples of motions of a doll in case of a sudden departure, an emergency brake and an emergency handle.
Figure 8B:
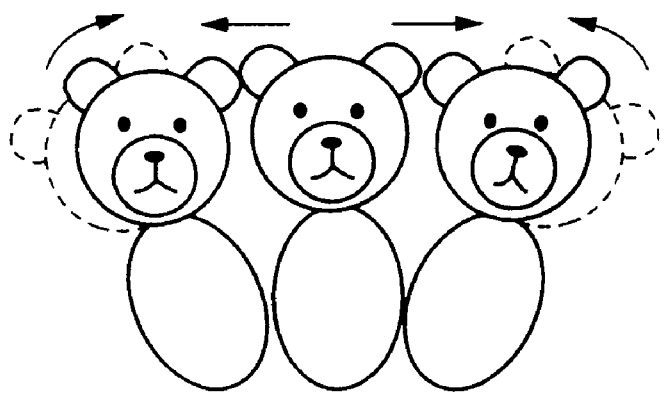

FIGS. 8(A)–8(B) are illustrations showing examples of motions of a doll in case of a sudden departure, an emergency brake and an emergency handle.

When the emergency brake is concerned, as shown in FIG. 8(A), the doll leans forward and generates a voice "Be careful!" while the doll raises its head.

In case of the sudden departure, as shown in FIG. 8(A), the doll leans backward and generates a voice "Terrible!" while the doll raises its head.

In case of the emergency handle, as shown in FIG. 8(B), the doll leans to the right or the left and generates a voice "Oh, No!" while the doll raises its head.

In this manner, in case of the emergency brake, the sudden departure and the emergency handle, the respective associated voice is generated, and the respective associated motion is taken. This makes it possible to call a driver's attention to a safe driving.

Figure 9:
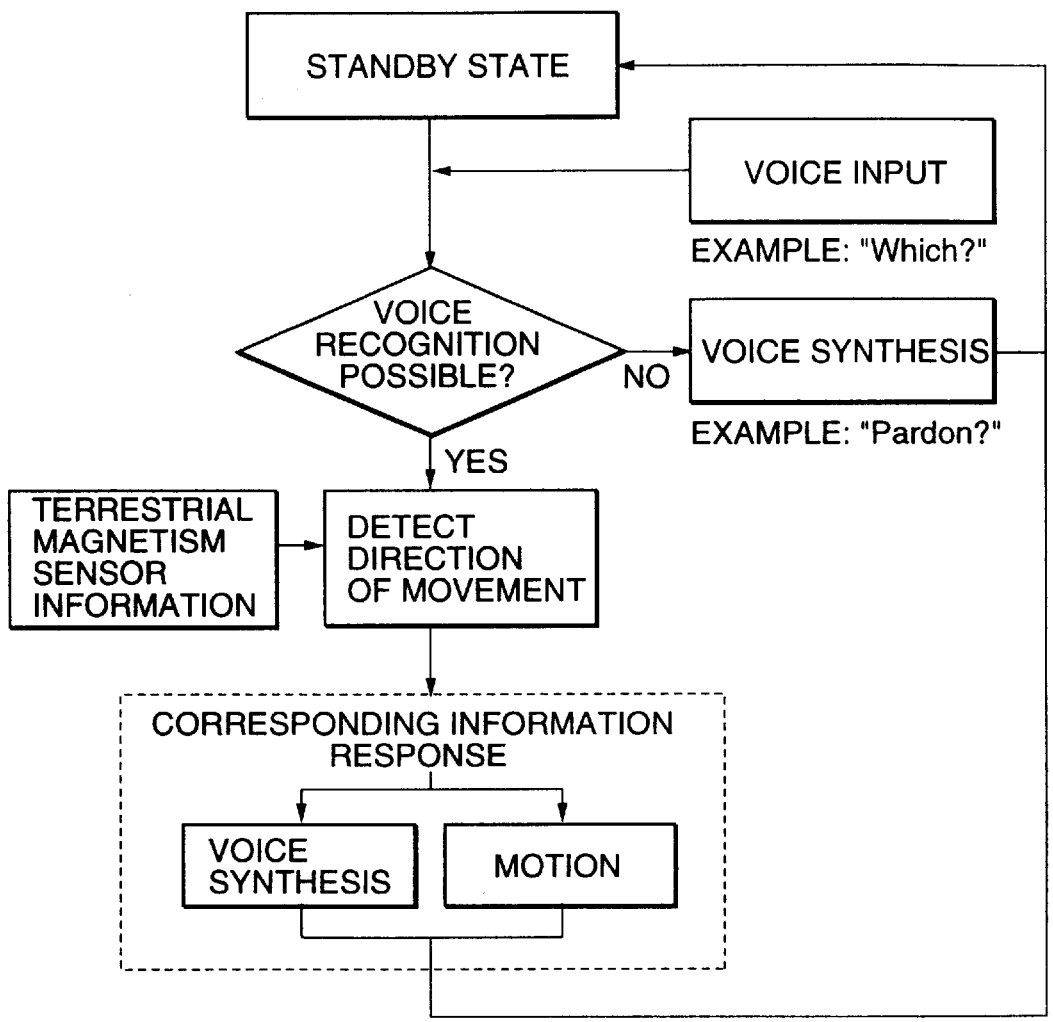
FIG. 9 is a flowchart useful for understanding a motion flow for a "confirmation of direction".
Figure 10:
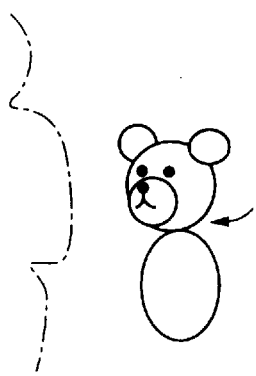
FIG. 10 is an illustration showing an example of motions of a doll.

FIG. 9 is a flowchart useful for understanding a motion flow for a "confirmation of direction". FIG. 10 is an illustration showing an example of motions of a doll.

In the standby state, when a voice of "which ?" is inputted and the voice is recognized, the question is interpreted, so that a direction of movement is detected in accordance with information obtained by the terrestrial magnetism sensor and the head of the doll turns to a driver as shown in FIG. 10, and a voice, for example, "Looking the north" is generated.

Thus, it is possible for a driver to readily confirm a direction of movement of the car without altering one's eyes and posture, and also to expect a safe driving.

Figure 11:
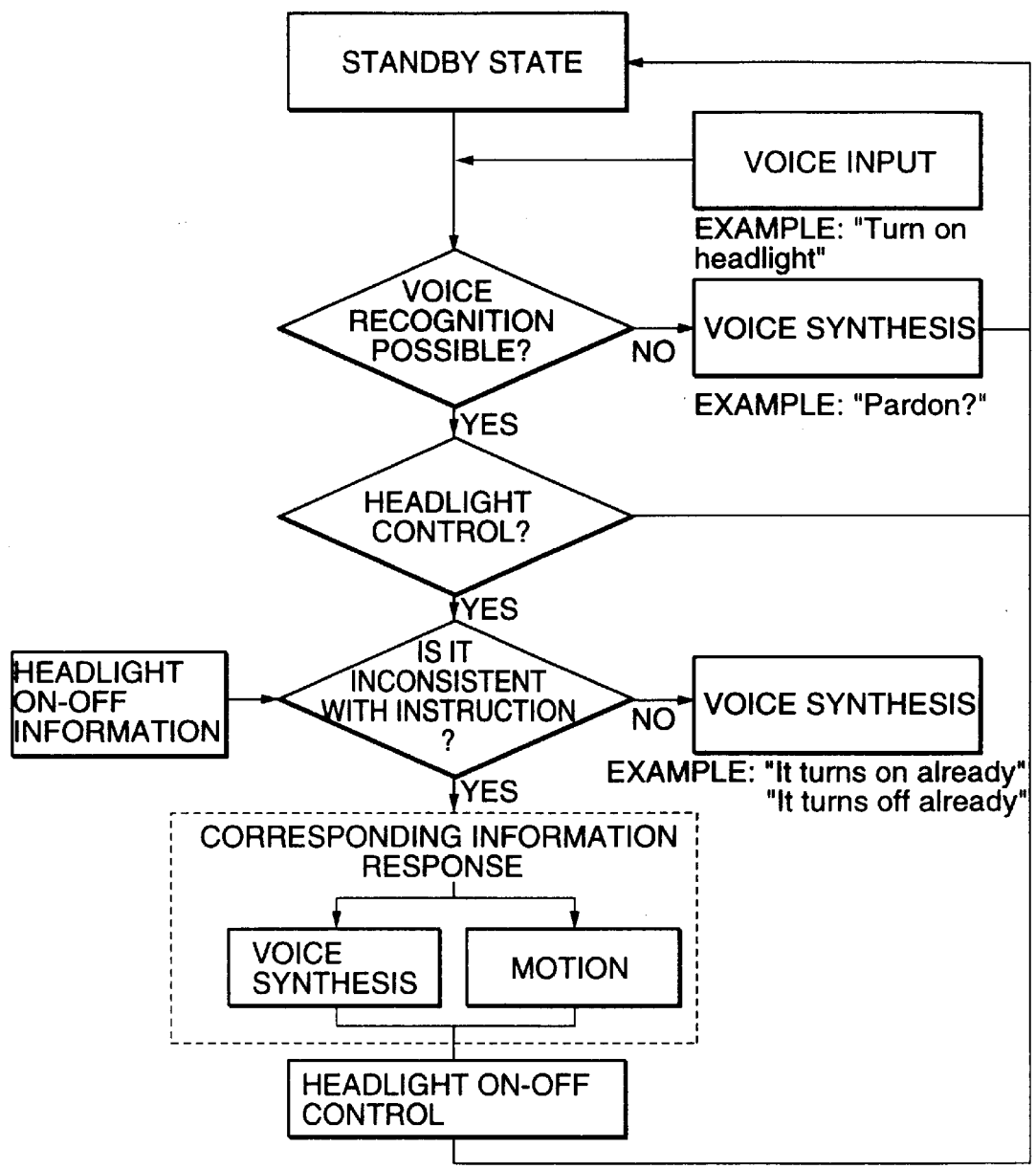
FIG. 11 is a flowchart useful for understanding a motion flow for a "tunnel measure".
Figure 12:
FIG. 12 is an illustration showing an example of motions of a doll.

FIG. 11 is a flowchart useful for understanding a motion flow for a "Tunnel measure". FIG. 12 is an illustration showing an example of motions of a doll.

When a voice of "Turn on the head light" or "Turn off the head light" is inputted and the voice is recognized, the instruction is interpreted, so that the instruction is compared with head light ON/OFF information. In the event that the head light is in a state that the instruction has been already executed, for example, in the event that an instruction of "Turn on the head light" is generated when the head light is already in a state of turn-on, a respond of "It turns on already" is made through the voice synthesis. On the other hand, in the event that the instruction is executable, as shown in FIG. 12, the doll generates a voice of "The light will be turned on" or "The light will be turned off", while nodding, and in addition transmits a control signal associated with the voice to a head light control equipment of the car.

Thus, it is possible for a driver to readily perform an operation of turn-on and turn-off of the head light of the car in motion without altering one's eyes and posture, and also to expect a safe driving.

Figure 13:
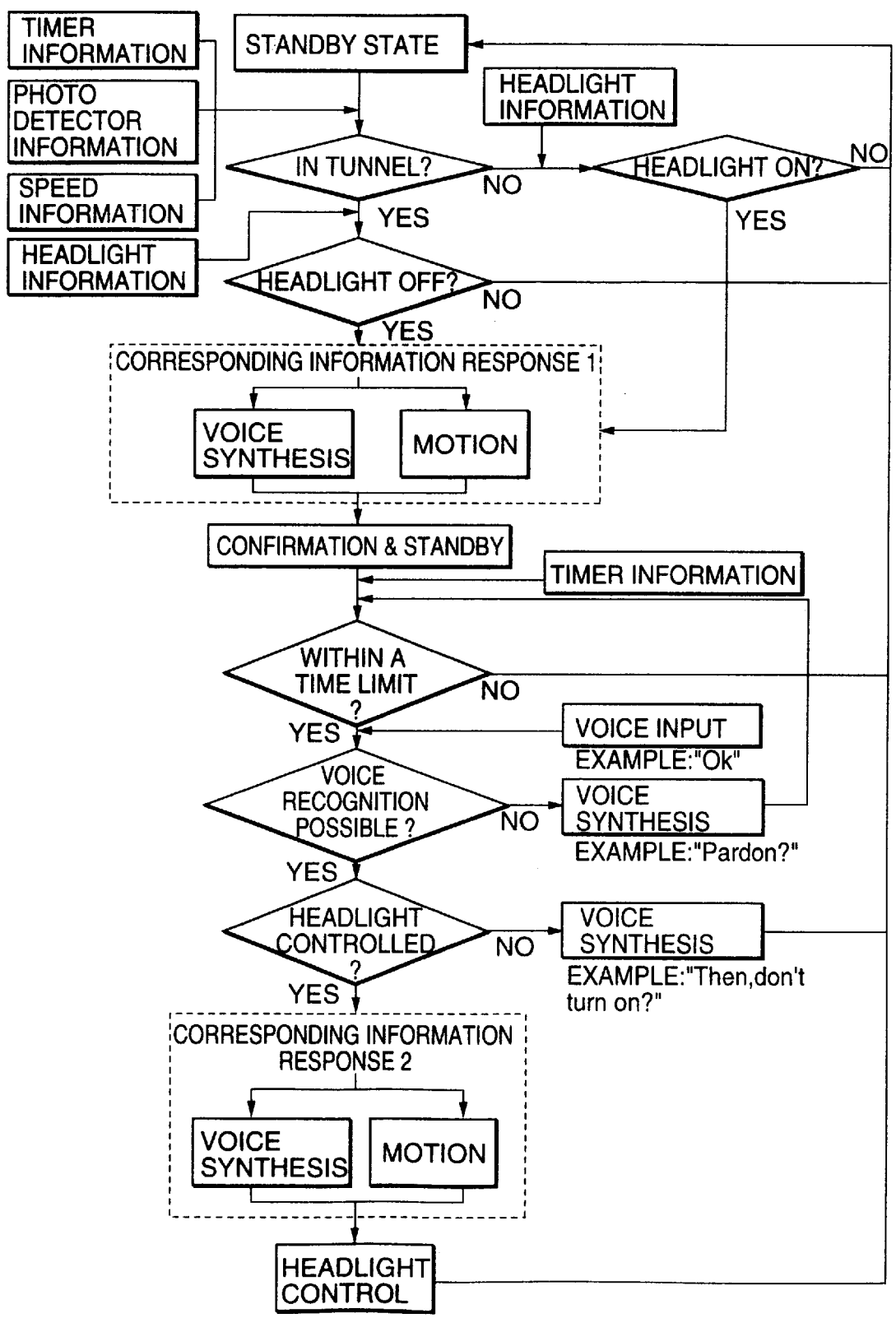
FIG. 13 is a flowchart useful for understanding another motion flow for a "tunnel measure".
Figure 14A:
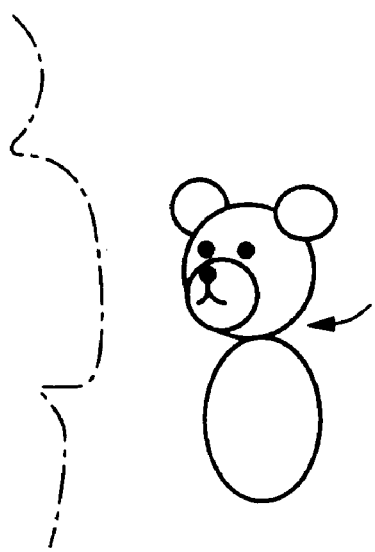
FIGS. 14(A)–(B) are illustrations showing examples of motions of a doll.
Figure 14B:
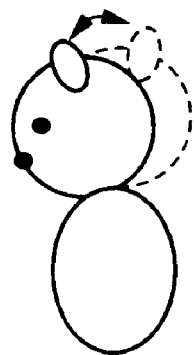

FIG. 13 is a flowchart useful for understanding another motion flow for a "Tunnel measure". FIGS. 14(A)–(B) are illustrations showing examples of motions of a doll.

It is determined that a car enters a tunnel or goes out of a tunnel by means of obtaining timer information, photo detector information and speed information and detecting such a condition that the car is in motion and a predetermined time elapses after change of luminance of surrounding.

In the event that the car goes out of a tunnel, head light information is referred to to determine turn-on or turn-off of the head light. When the head light turns off, the process returns to the standby state. When the head light turns on, although the car goes out of the tunnel, the doll turns to a driver as shown in FIG. 14(A), and a voice, "Light still turns on ? To be turned off?" is generated.

Thereafter, for some time, there is provided a pause during which "Yes" or "No" is inputted. When a voice of "No" is recognized, "Then, light will not be turned off" is generated.

On the other hand, when a voice of "Yes" is recognized, as shown in FIG. 14(B), the doll generates a voice of "The light will be turned off", while nodding, and in addition transmits a control signal associated with the voice to a head light control equipment of the car.

As it is recognized in accordance with timer information, photo detector information and speed information that the car enters a tunnel, it is decided as to turn-on or turn-off of the head light in accordance with head light information. When the head light is turned on already, the process returns to the standby state.

When the head light is turned off, the head of the doll turns to a driver as shown in FIG. 14(A), and a voice of "It is a tunnel, isn't it? Is the light to be turned on? " is generated. Thereafter, for some time, there is provided a pause during which "Yes" or "No" is inputted. When a voice of "No" is recognized, "Then, light will not be turned on" is generated.

On the other hand, when a voice of "Yes" is recognized, as shown in FIG. 14(B), the doll generates a voice of "The light will be turned on", while nodding, and in addition transmits a control signal associated with the voice to the head light control equipment of the car.

This feature makes it possible to call a driver's attention when the driver forgets the turn-on or turn-off of the head light, and it is possible for a driver to readily perform an operation for the turn-on or turn-off of the head light without altering one's eyes and posture.

While FIG. 13 shows an arrangement in which speed information is obtained, it is acceptable to provide an arrangement in which information from the vibration sensor instead of the speed information is obtained to recognize that the car is in motion. This is applicable to other flows which will be described hereinafter.

Figure 15:
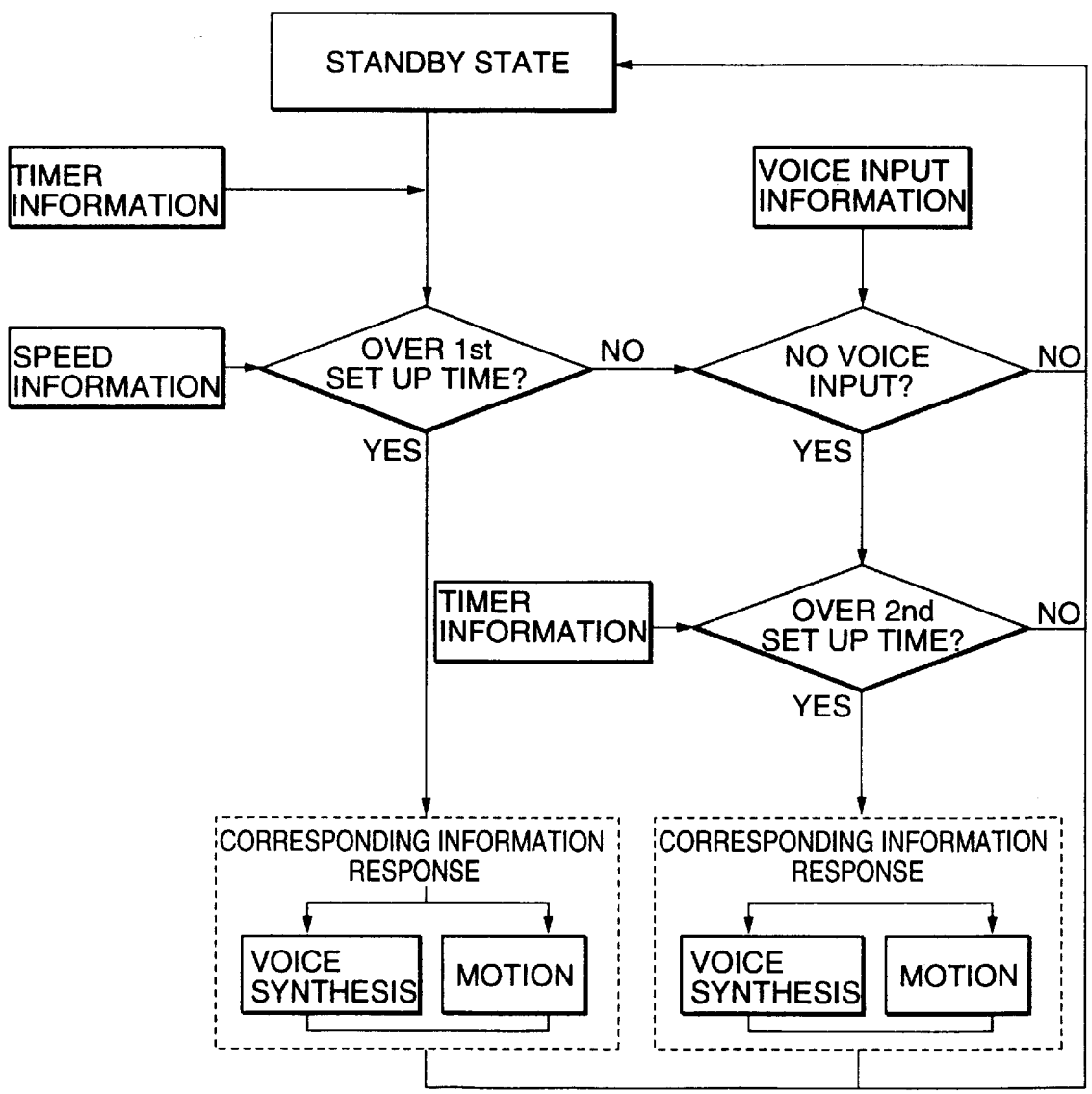
FIG. 15 is a flowchart useful for understanding a motion flow for a "long time continuous drive".
Figure 16A:
FIGS. 16(A)–(B) are illustrations showing examples of motions of a doll.
Figure 16B:
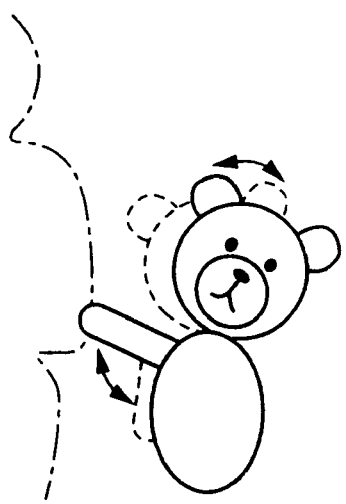

FIG. 15 is a flowchart useful for understanding a motion flow for a "long time continuous drive". FIGS. 16(A)–(B) are illustrations showing examples of motions of a doll.

A flow shown in FIG. 15 is repeatedly executed for each predetermined time. In the flow, timer information and speed information (or information of the vibration sensor) are interpreted to determine as to whether such a long time continuous driving that it needs a rest is performed. When it is decided that such a long time continuous driving that it needs a rest is performed, that is, a continuous driving is performed exceeding a first set up time, the head of the doll turns to a driver and the right hand of the doll moves up and down, as shown in FIG. 16(A), and a voice of "Shall we have a rest?" is generated.

On the other hand, when a state that no voice is inputted continues more than a second set up time, but it is not such a long time continuous driving that it needs a rest, the doll leans its neck to the side and raises the right hand, and a voice of "Let's play" is generated.

This feature makes it possible to call a driver's attention when the driver has a long time continuous driving or inputs no voice for a long time, and thus it is possible to expect a safe driving.

Figure 17:
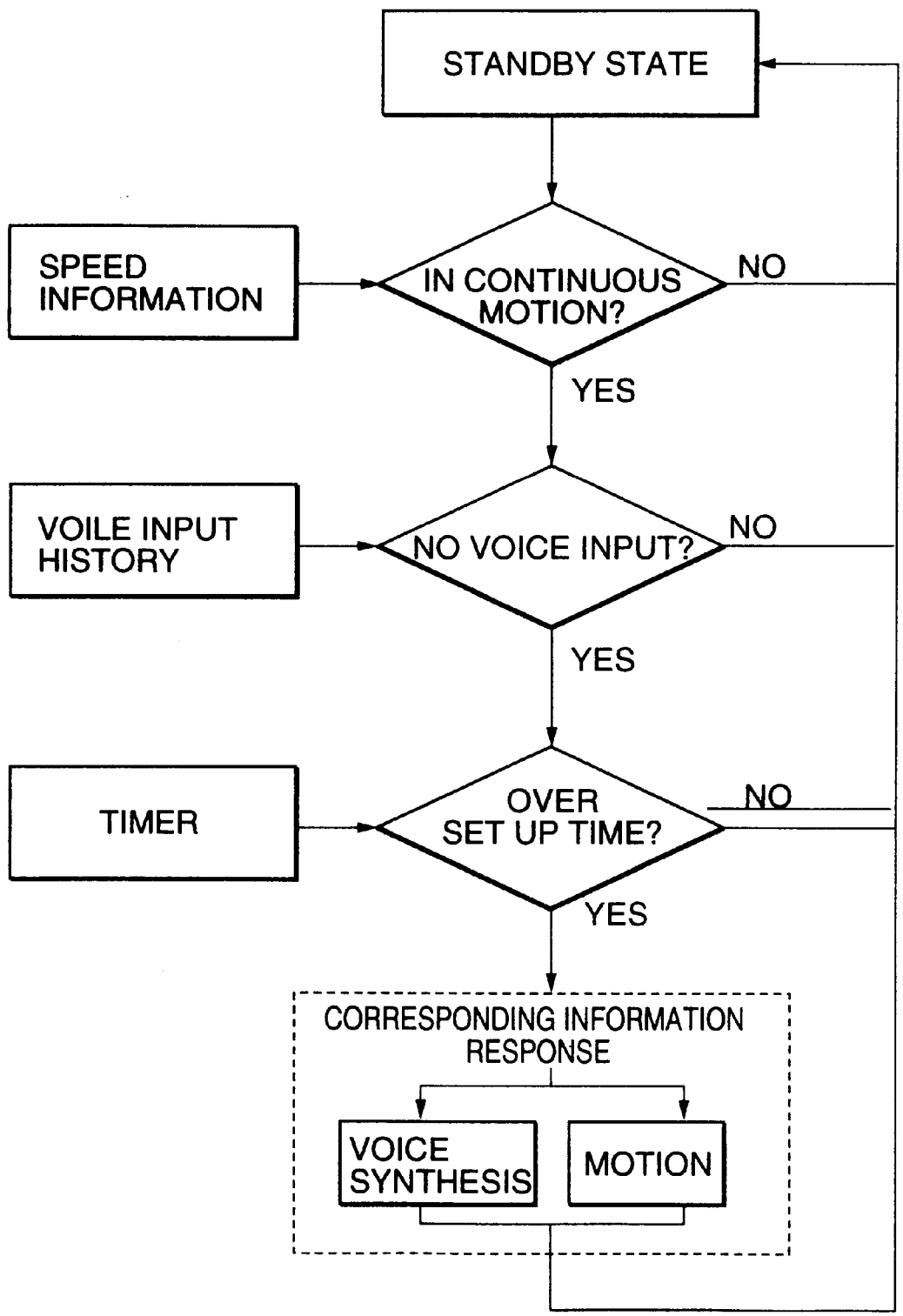
FIG. 17 is a flowchart useful for understanding a motion flow for a "prevention of a doze".
Figure 18:
FIG. 18 is an illustration showing an example of motions of a doll.

FIG. 17 is a flowchart useful for understanding a motion flow for a "prevention of a doze". FIG. 18 is an illustration showing an example of motions of a doll.

A flow shown in FIG. 17 is repeatedly executed for each predetermined time. First, speed information (or information from the vibration sensor) is derived to determine whether a car is continuously in motion for a long time. When it is decided that the car is continuously in motion for a long time, the presence or the absence of the voice input is determined in accordance with the past record of the voice input. When no voice is inputted over a set up time referring to timer information, the head of the doll turns to a driver and the right hand of the doll moves up and down, as shown in FIG. 18, and a voice of "Are you sleeping now ?" is generated.

This feature makes it possible to prevent a doze driving and thus it is possible to expect a safe driving.

Figure 19:
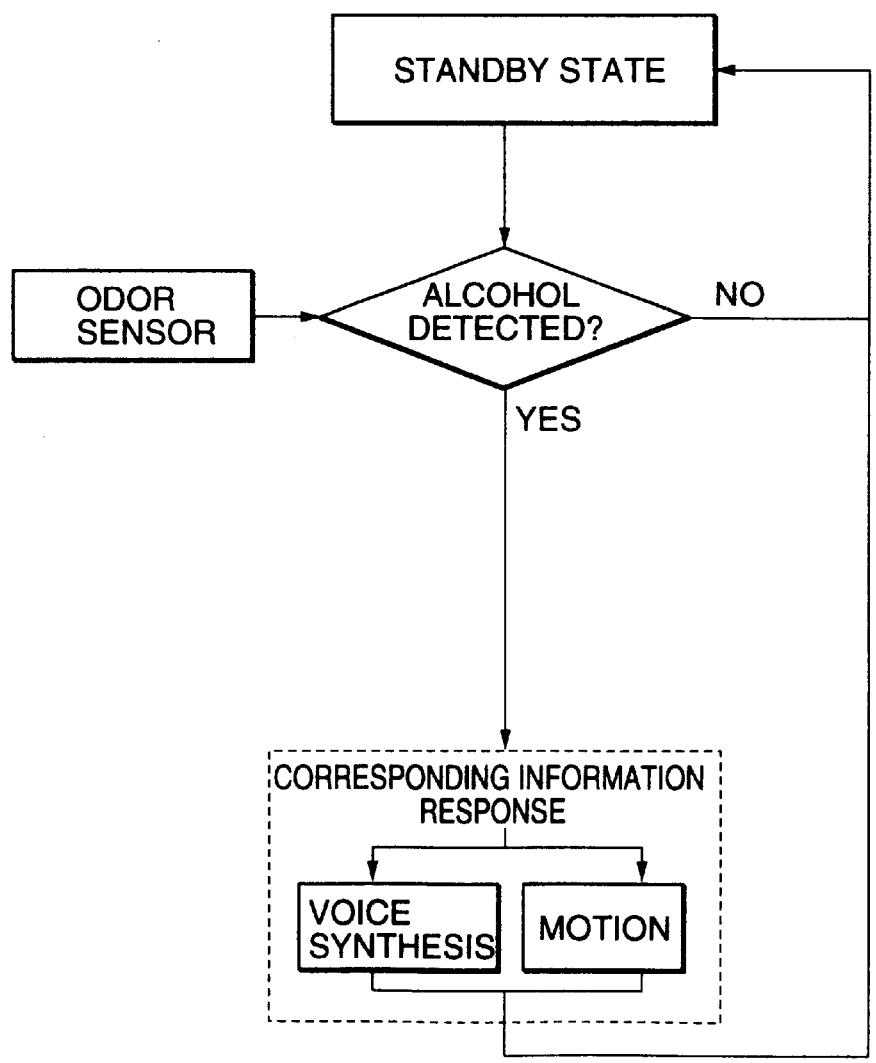
FIG. 19 is a flowchart useful for understanding a motion flow for a "drunken driving".
Figure 20:
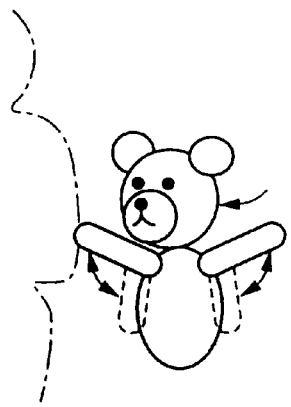
FIG. 20 is an illustration showing an example of motions of a doll.

FIG. 19 is a flowchart useful for understanding a motion flow for a "drunken driving". FIG. 20 is an illustration showing an example of motions of a doll.

When an alcohol smell is detected in accordance with the odor sensor information, as shown in FIG. 20, the doll turns the driver and moves the both hands up and down, and a voice of "It smells like alcohol. Don't drive in drinking." is generated.

Thus, it is possible to call a driver's attention to a safe driving.

Figure 21:
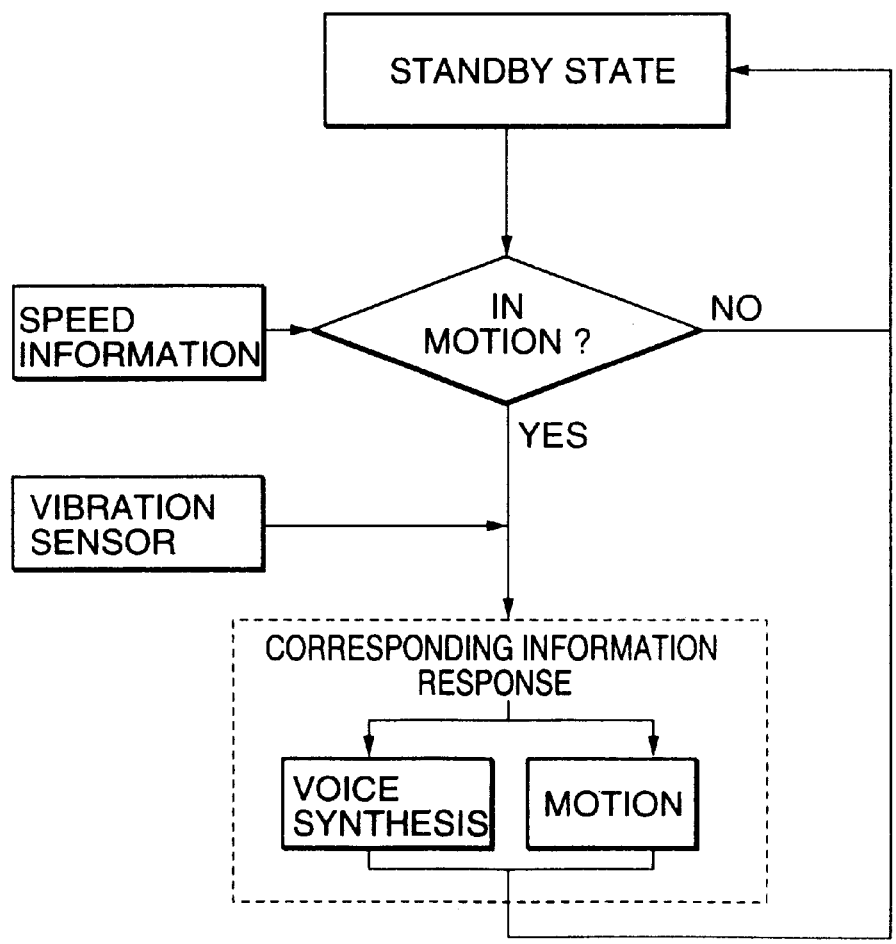
FIG. 21 is a flowchart useful for understanding a motion flow for a "bad road drive".
Figure 22:
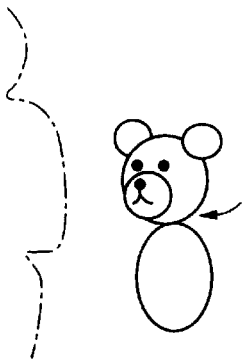
FIG. 22 is an illustration showing an example of motions of a doll.

FIG. 21 is a flowchart useful for understanding a motion flow for a "bad road drive". FIG. 22 is an illustration showing an example of motions of a doll.

When it is detected in accordance with speed information and the vibration sensor that a car is in motion on a bad road, as shown in FIG. 22, the doll turns the driver, and a voice of "Bad road ! Be careful" is generated.

Thus, it is possible to call a driver's attention to a safe driving.

Here, while the speed information is referred to too, it is acceptable that only the vibration sensor is used to decide whether a car is in motion on a bad road.

Figure 23:
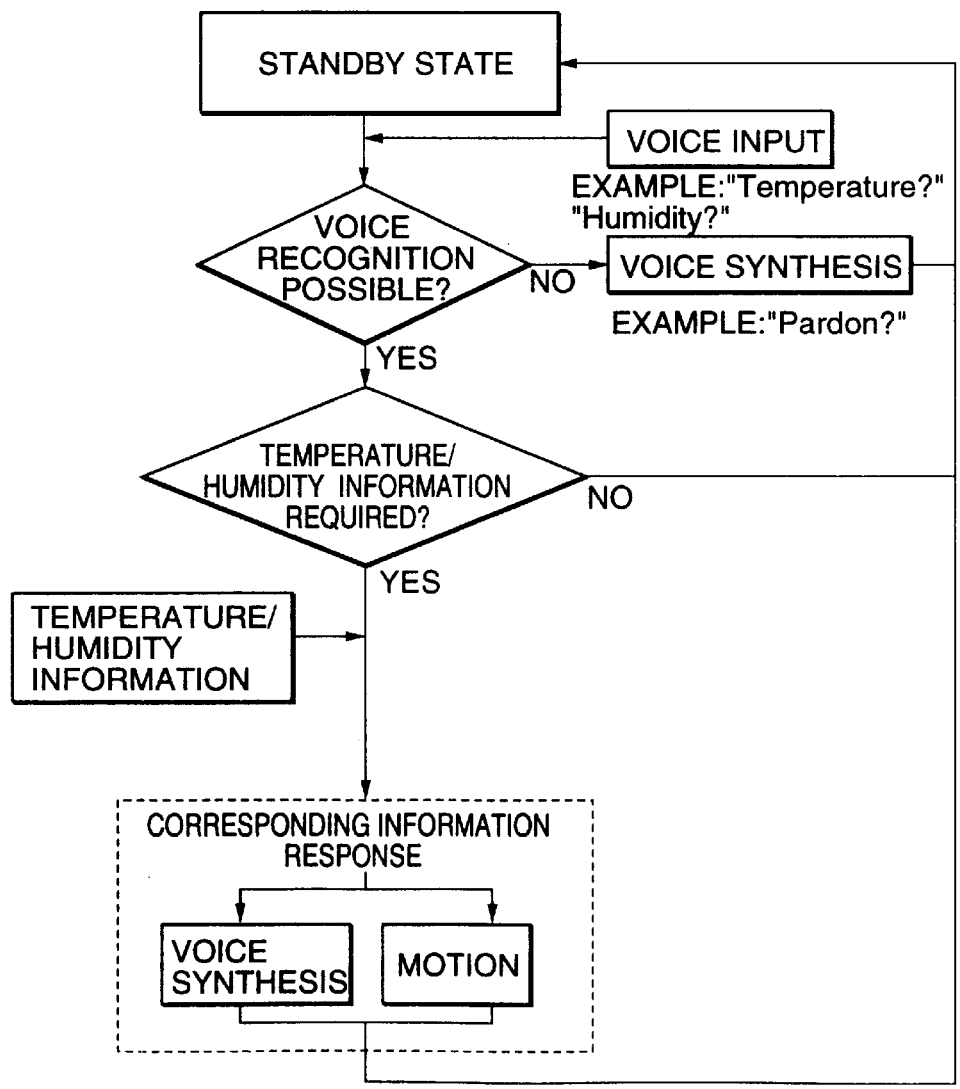
FIG. 23 is a flowchart useful for understanding a motion flow for a "temperature/humidity confirmation".
Figure 24:
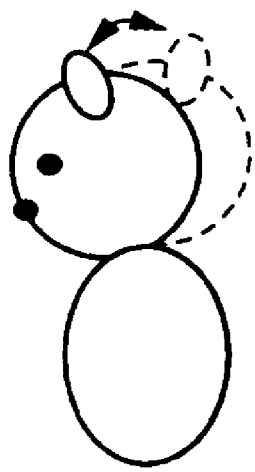
FIG. 24 is an illustration showing an example of motions of a doll.

FIG. 23 is a flowchart useful for understanding a motion flow for a "temperature/humidity confirmation". FIG. 24 is an illustration showing an example of motions of a doll.

In the standby state, when a voice of "Temperature ?" or "Humidity ?" is inputted and the voice is recognized, the question is interpreted, so that information is obtained from the temperature sensor or the humidity sensor and the doll nods as shown in FIG. 24, and a voice, for example, "25°" or "70%" is generated.

Thus, it is possible for a driver to know the temperature or the humidity of the car room without altering one's eyes, and thus to expect a safe driving.

Figure 25:
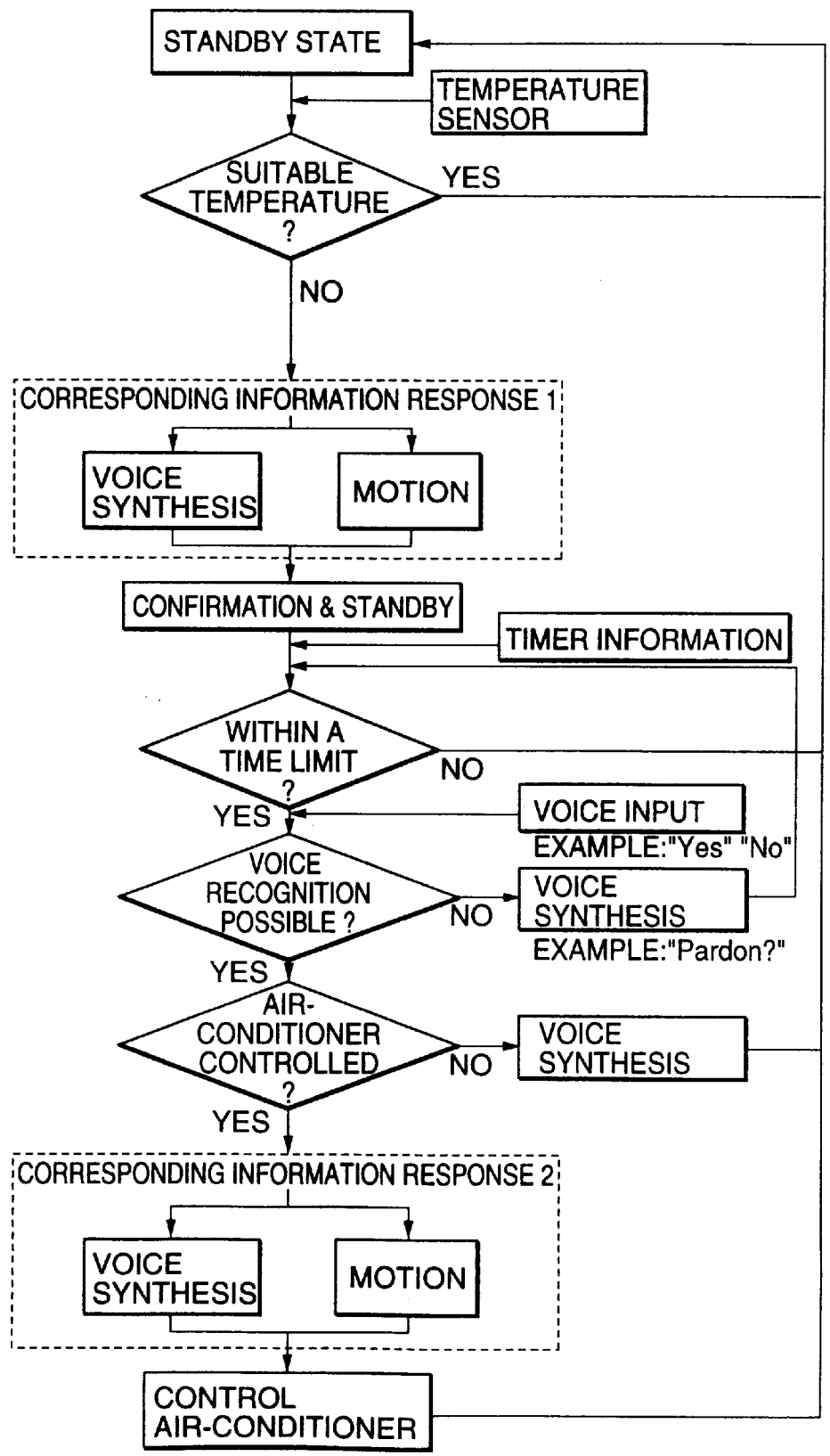
FIG. 25 is a flowchart useful for understanding a temperature control flow.
Figure 26A:
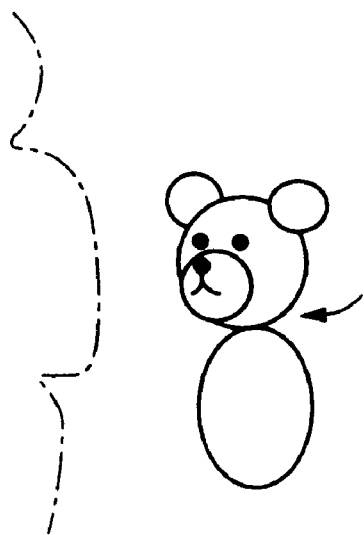
FIGS. 26(A)–26(B) are illustrations showing examples of motions of a doll.
Figure 26B:

FIG. 25 is a flowchart useful for understanding a temperature control flow. FIGS. 26(A)–26(B) are illustrations showing examples of motions of a doll.

Here, it is determined in accordance with temperature sensor information whether temperature of a car room is within a suitable temperature. When it is decided that the temperature of the car room is out of a suitable temperature, as shown in FIG. 26(A), the doll turns the driver, and a voice of "Hot ?" or "Cold ?" is generated in accordance with the set up temperature. Thereafter, a voice of "Yes" or "No" is inputted within a predetermined time limit. When a voice of "No" is recognized, a voice of "Ok?" is generated. On the other hand, when a voice of "Yes" is recognized, the doll nods as shown in FIG. 26(B) and generates a voice of "Temperature will go down" or "Temperature will go up", and further transmits to an air-conditioning equipment a signal for an air-conditioning control to increase or decrease temperature.

Thus, it is possible to provide a comfortable driving environment for a driver without altering one's eyes and posture, and thus to expect a safe driving.

Figure 27:
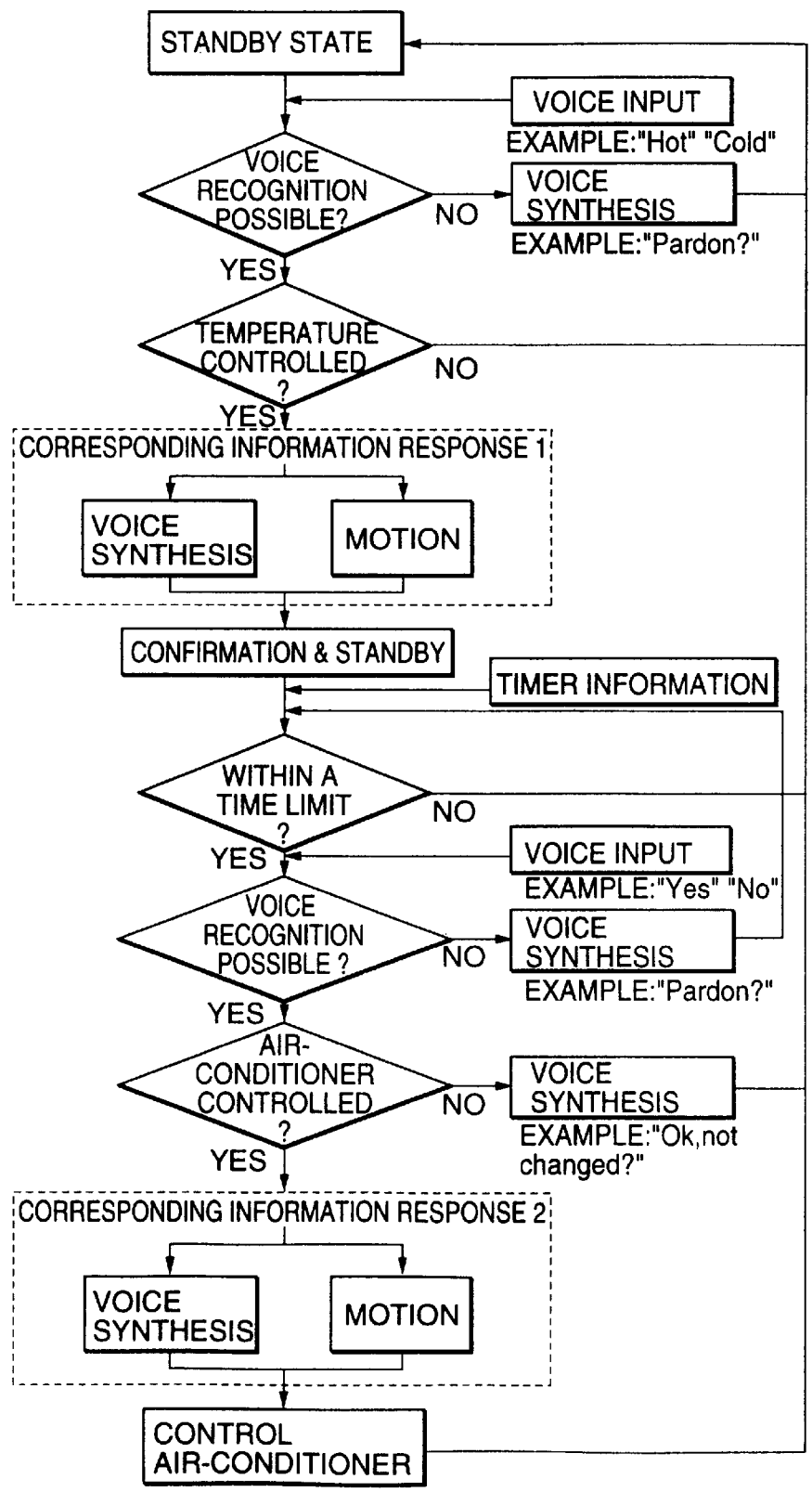
FIG. 27 is a flowchart useful for understanding an alternative temperature control flow.
Figure 28A:
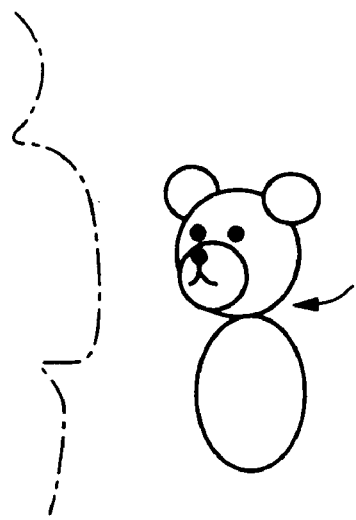
FIGS. 28(A)–28(B) are illustrations showing examples of motions of a doll.
Figure 28B:
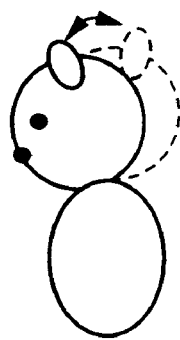

FIG. 27 is a flowchart useful for understanding an alternative temperature control flow. FIGS. 28(A)–28(B) are illustrations showing examples of motions of a doll.

Here, a voice of anyone of "Hot", "Cold", "Increase temperature" and "Decrease temperature" is inputted to recognize the voice, so that the temperature control instruction is interpreted.

Here, the temperature control is not carried out immediately after the temperature control instruction is interpreted. When "Hot" or "Decrease temperature" is recognized, as shown in FIG. 28(A), the doll turns a driver and asks back "Is the temperature to be decreased ?". On the other hand, when "Cold" or "Increase temperature" is recognized, the doll asks back "Is the temperature to be increased?".

Thereafter, for some time, there is provided a pause during which "Yes" or "No" is inputted. When a voice of "No" is recognized, "Then, temperature will not be changed" is generated. On the other hand, when a voice of "Yes" is recognized, as shown in FIG. 28(B), the doll nods and generates, in case of decreasing temperature, a voice of "Temperature will be decreased", and in case of increasing temperature, a voice of "Temperature will be increased", and in addition transmits to an air-conditioning equipment a signal for an air-conditioning control.

Thus, it is possible to perform a temperature control for the car room through a natural conversation without altering one's eyes and posture, and thus to expect a safe driving.

Figure 29:
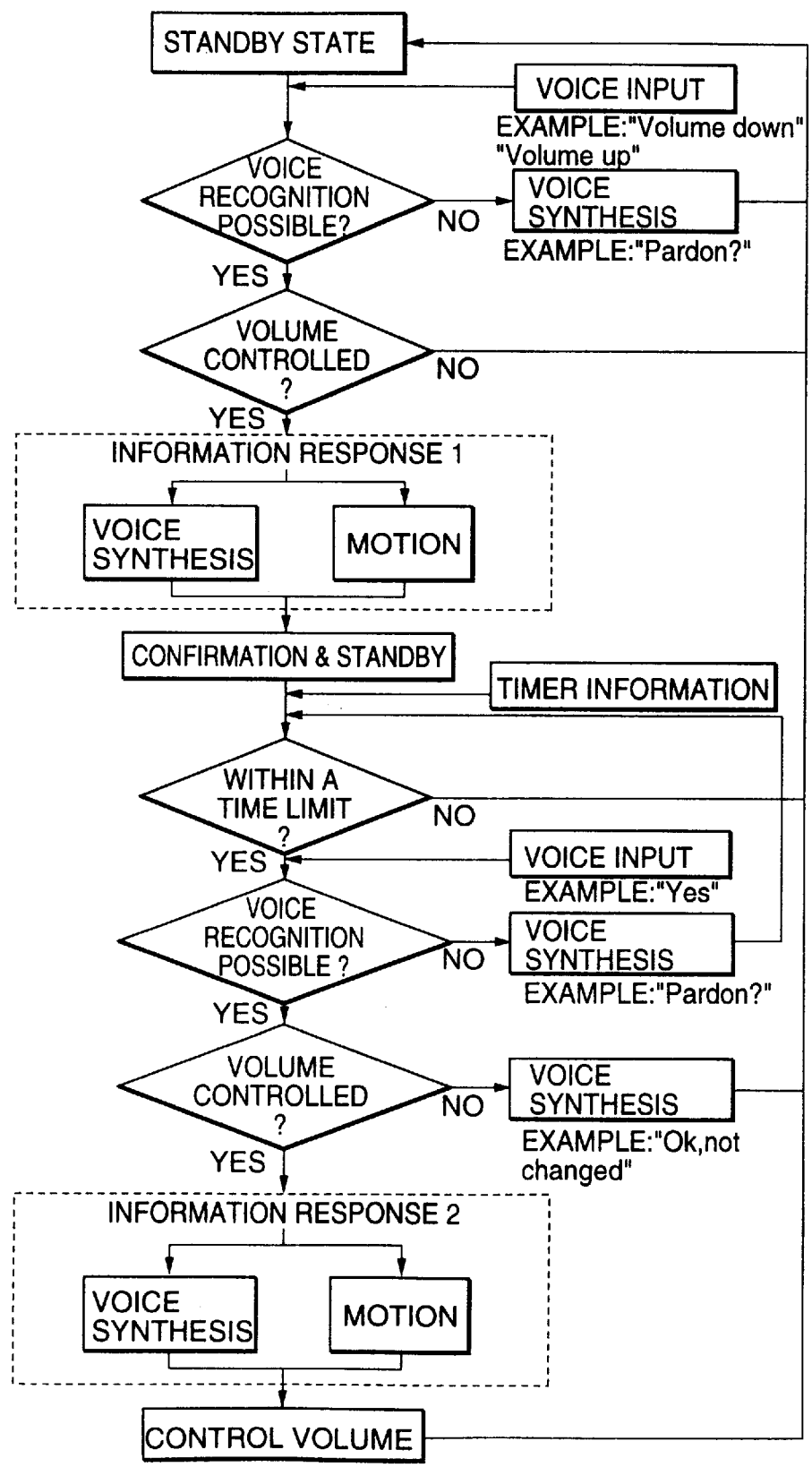
FIG. 29 is a flowchart useful for understanding a volume control flow.
Figure 30A:
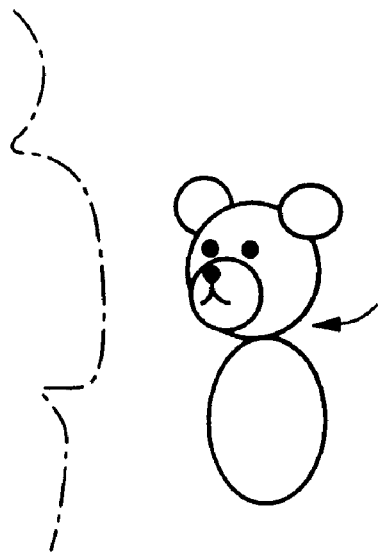
FIGS. 30(A)–30(B) are illustrations showing examples of motions of a doll.
Figure 30B:
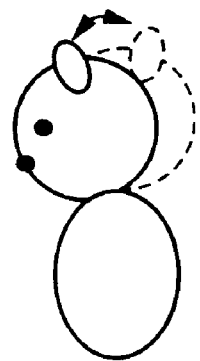

FIG. 29 is a flowchart useful for understanding a volume control flow. FIGS. 30(A)–30(B) are illustrations showing examples of motions of a doll.

Here, a voice of anyone of "Volume down" and "Volume up" is inputted to recognize the voice, so that the volume control instruction is interpreted.

Here, the volume control is not carried out immediately after the volume control instruction is interpreted. When "Volume down" or "Volume up" is recognized, as shown in FIG. 30(A), the doll turns a driver and asks back "Is the volume to be decreased?" or "Is the volume to be increased?" in accordance with the interpreted volume control instruction.

Thereafter, for some time, there is provided a pause during which "Yes" or "No" is inputted. When a voice of "No" is recognized, "Then, volume will not be changed" is generated. On the other hand, when a voice of "Yes" is recognized, as shown in FIG. 30(B), the doll nods and generates, in case of decreasing volume, a voice of "Volume will be decreased", and in case of increasing volume, a voice of "Volume will be increased", and in addition transmits to an on-vehicle acoustic equipment a signal for a volume control.

Thus, in a similar fashion to that of the temperature control, it is possible to perform a volume control for the on-vehicle acoustic equipment through a natural conversation without altering one's eyes and posture, and thus to expect a safe driving.

Figure 31:
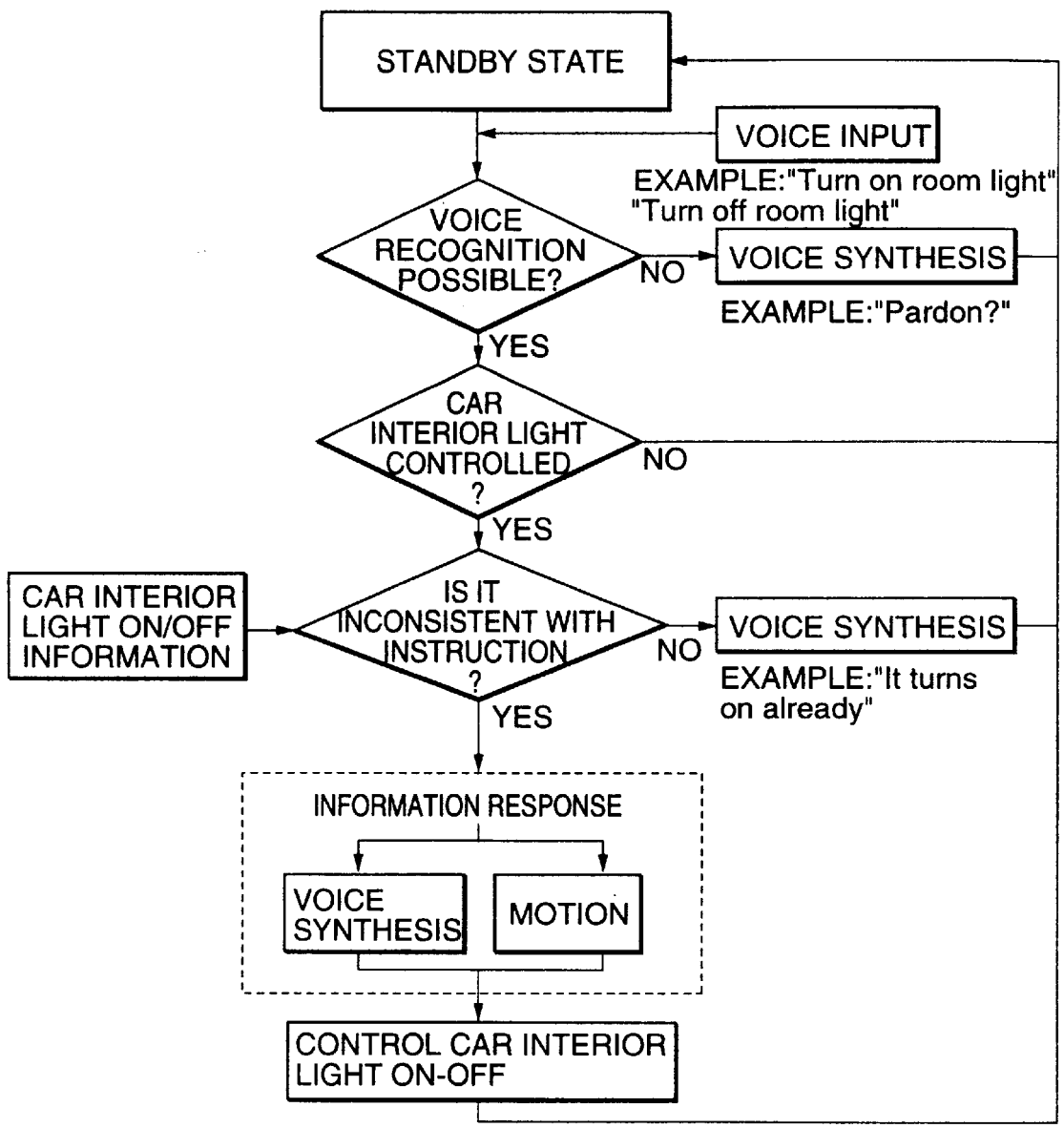
FIG. 31 is a flowchart useful for understanding a car interior light control flow.
Figure 32:
FIG. 32 is an illustration showing an example of motions of a doll.

FIG. 31 is a flowchart useful for understanding a car interior light control flow. FIG. 32 is an illustration showing an example of motions of a doll.

Here, a voice of anyone of "Turn on room light" and "Turn off room light" is inputted to recognize the voice, so that the instruction is interpreted. Next, information as to turn-on/off of the car room light is obtained to compare it with the instruction. When it is inconsistent with the instruction, the doll responds "Light is turned on already" or "Light is turned off already". When it is consistent with the instruction, as shown in FIG. 32, the doll nodes and generates "Room light will be turned on" or "Room light will be turned off", and in addition transmits to a car interior lighting equipment a control signal.

Thus, it is possible to perform a turn-on/off control for the car room light through a natural conversation without altering one's eyes and posture, and thus to expect a safe driving.

Figure 33:
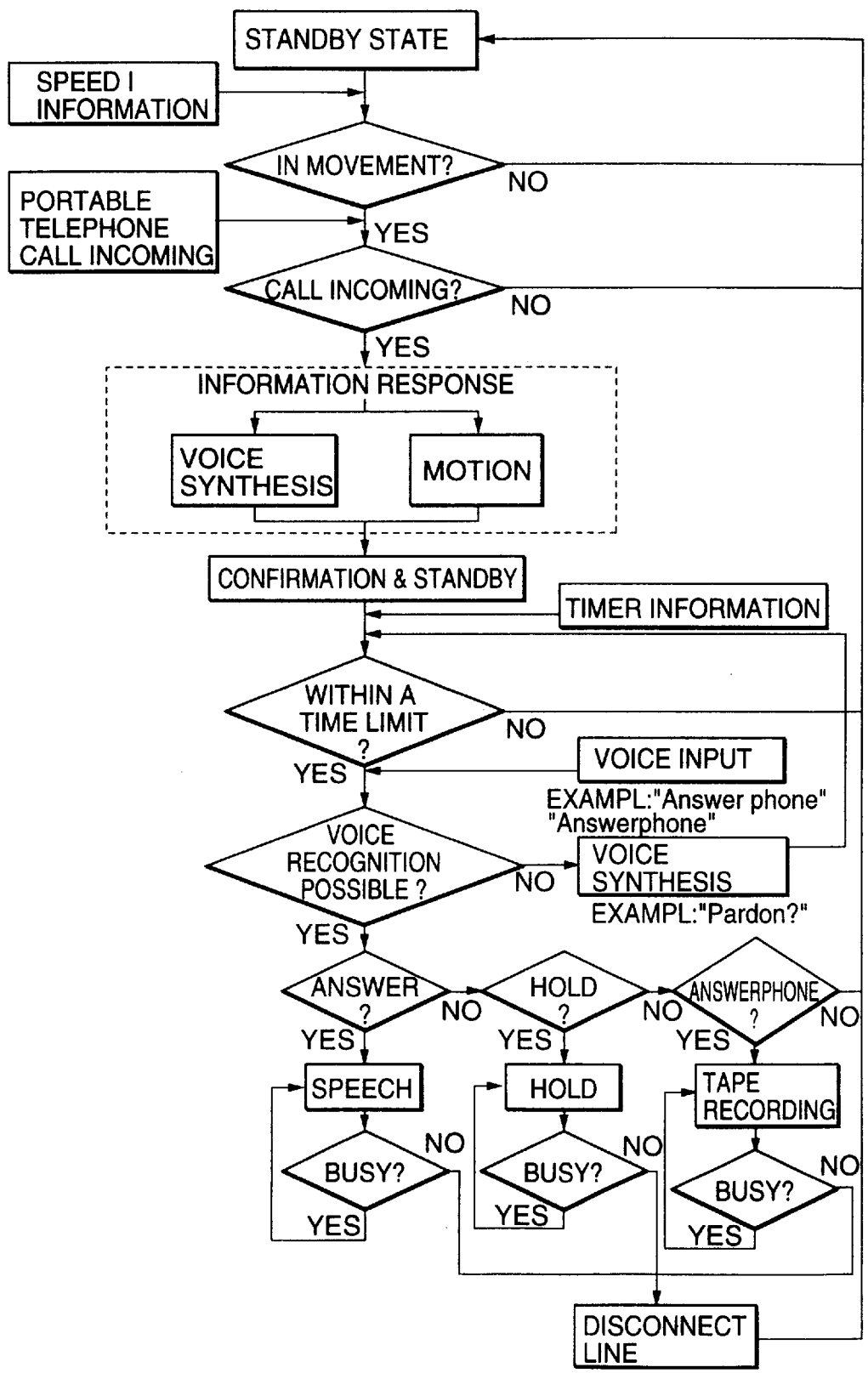
FIG. 33 is a flowchart useful for understanding a portable telephone call incoming.
Figure 34:
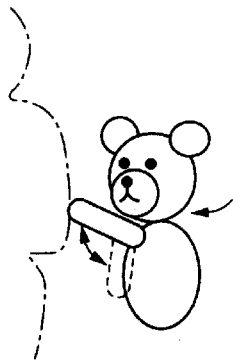
FIG. 34 is an illustration showing an example of motions of a doll.

FIG. 33 is a flowchart useful for understanding a portable telephone call incoming. FIG. 34 is an illustration showing an example of motions of a doll.

As a portable telephone call incoming occurs while a car is in motion, as shown in FIG. 34, the doll turn a driver and generates "Telephone call" while moving the right hand up and down. Thereafter, for some time, there is provided a pause during which a voice of "Answer the phone", "Hold" or "Answerphone" is inputted. When a voice of "Answer the phone", "Hold" or "Answerphone" is recognized, there is provided a control to a speech, a hold or an answerphone in accordance with a recognized result of the input voice. And when the speech is terminated, the line is disconnected. Here, in case of the speech, the microphone and the speaker, which are provided on the doll, are used to perform a conversation in hands-free. Thus, it is possible to perform a speech without altering one's eyes and posture, and thus to expect a safe driving.

Figure 35:
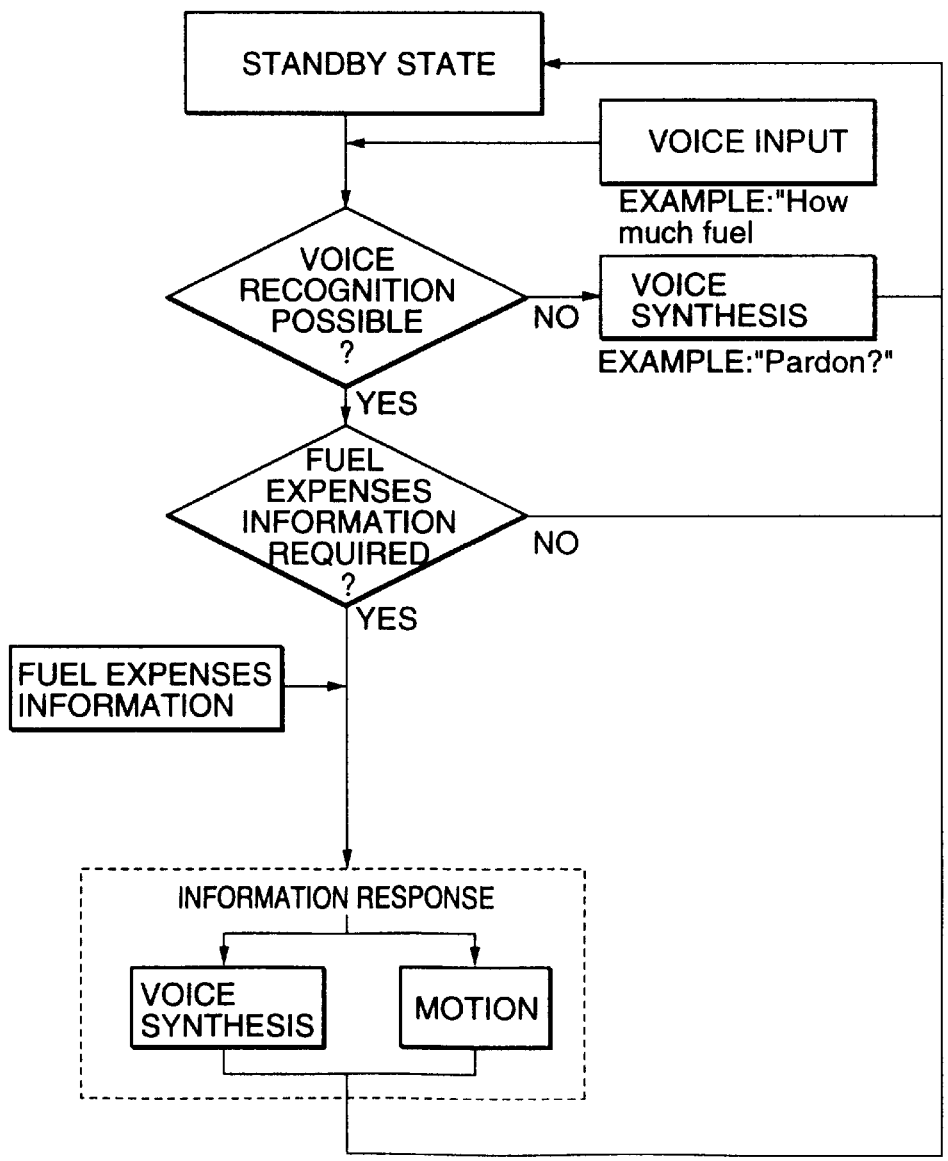
FIG. 35 is a flowchart useful for understanding a flow for confirming a fuel efficiency which is one of the states of a car.
Figure 36:
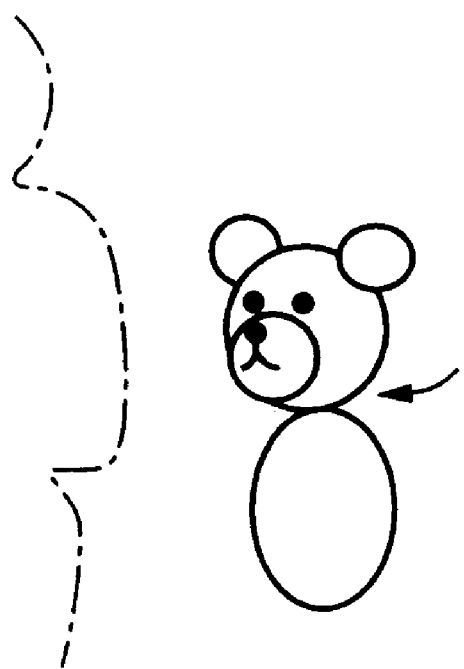
FIG. 36 is an illustration showing an example of motions of a doll.

FIG. 35 is a flowchart useful for understanding a flow for confirming a fuel efficiency which is one of the states of a car. FIG. 36 is an illustration showing an example of motions of a doll.

Here, when a voice of "Fuel efficiency ?" is inputted and the voice is recognized, the question is interpreted, so that fuel efficiency information is derived, and the head of the doll turns to a driver, as shown in FIG. 34, and a voice, for example, "About 10 km/liter" is generated as a response.

Thus, an arrangement such that inquiries as to states of a car (for example, the fuel efficiency, the speed, the rest of fuel and so forth) are accepted and responses are given makes it possible for a driver to obtain information as to the states of the car without altering one's eyes and posture, and thus to expect a safe driving.

Figure 37:
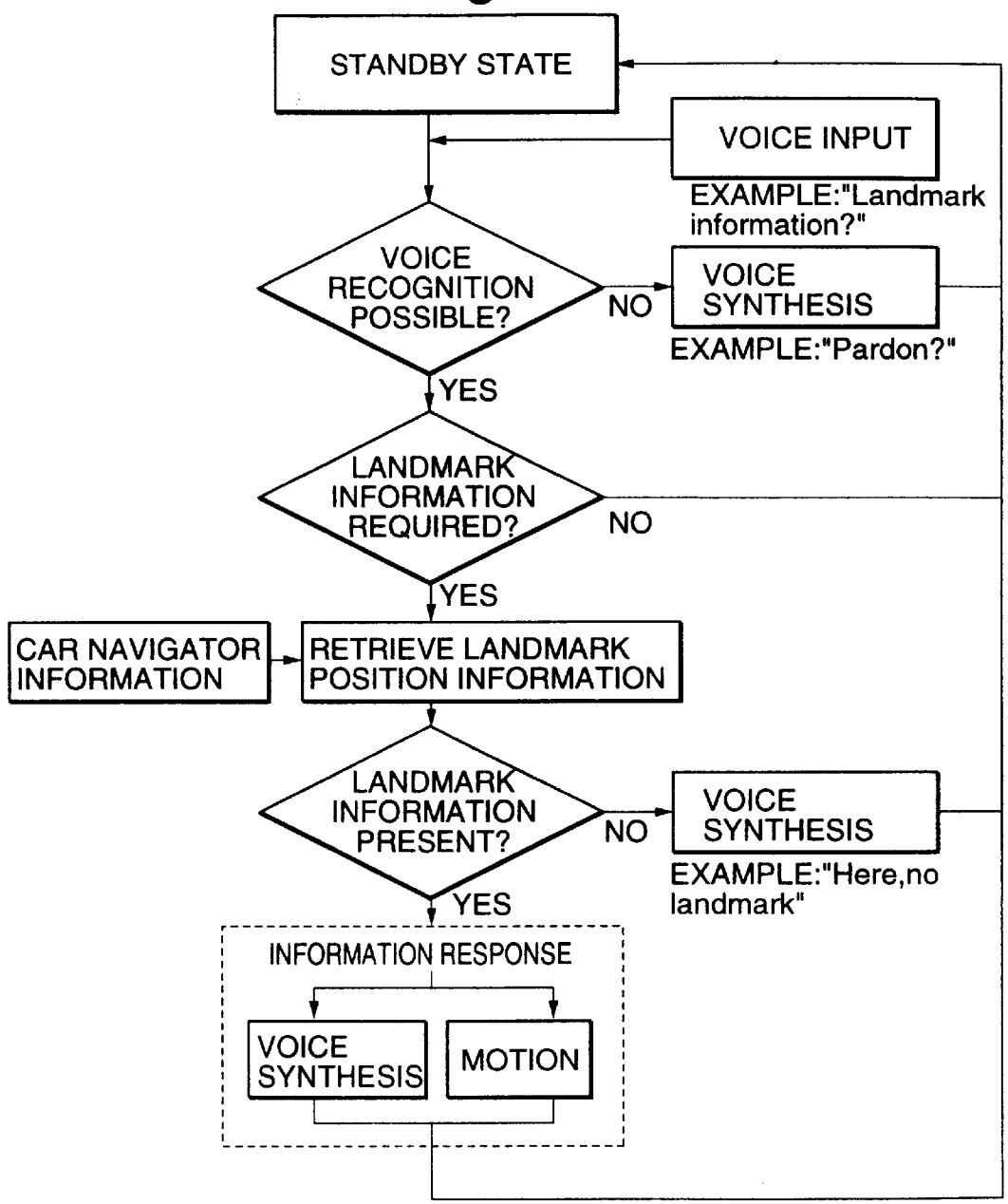
FIG. 37 is a flowchart useful for understanding a landmark informing flow.
Figure 38:
FIG. 38 is an illustration showing an example of motions of a doll.

FIG. 37 is a flowchart useful for understanding a landmark informing flow. FIG. 38 is an illustration showing an example of motions of a doll.

Here, when a voice of "Landmark information?" is inputted and the voice is recognized, it is interpreted that the question is concerned with a landmark applied to a place near the location where a car is in motion right now, so that landmark position information is retrieved in accordance with car navigation information. When it is decided that no landmark is applied to the place near the location where the car is in motion right now, a voice of, for example, "No landmark is found near here" through a voice synthesis is generated. On the other hand, when it is decided that a landmark is applied to the place near the location where the car is in motion right now, the doll leans to the side, as show in FIG. 38, and reproduces the associated landmark information.

Thus, it is possible for a driver to readily obtain information as to the landmark without altering one's eyes and posture, and thus to expect a safe driving.

Figure 39:
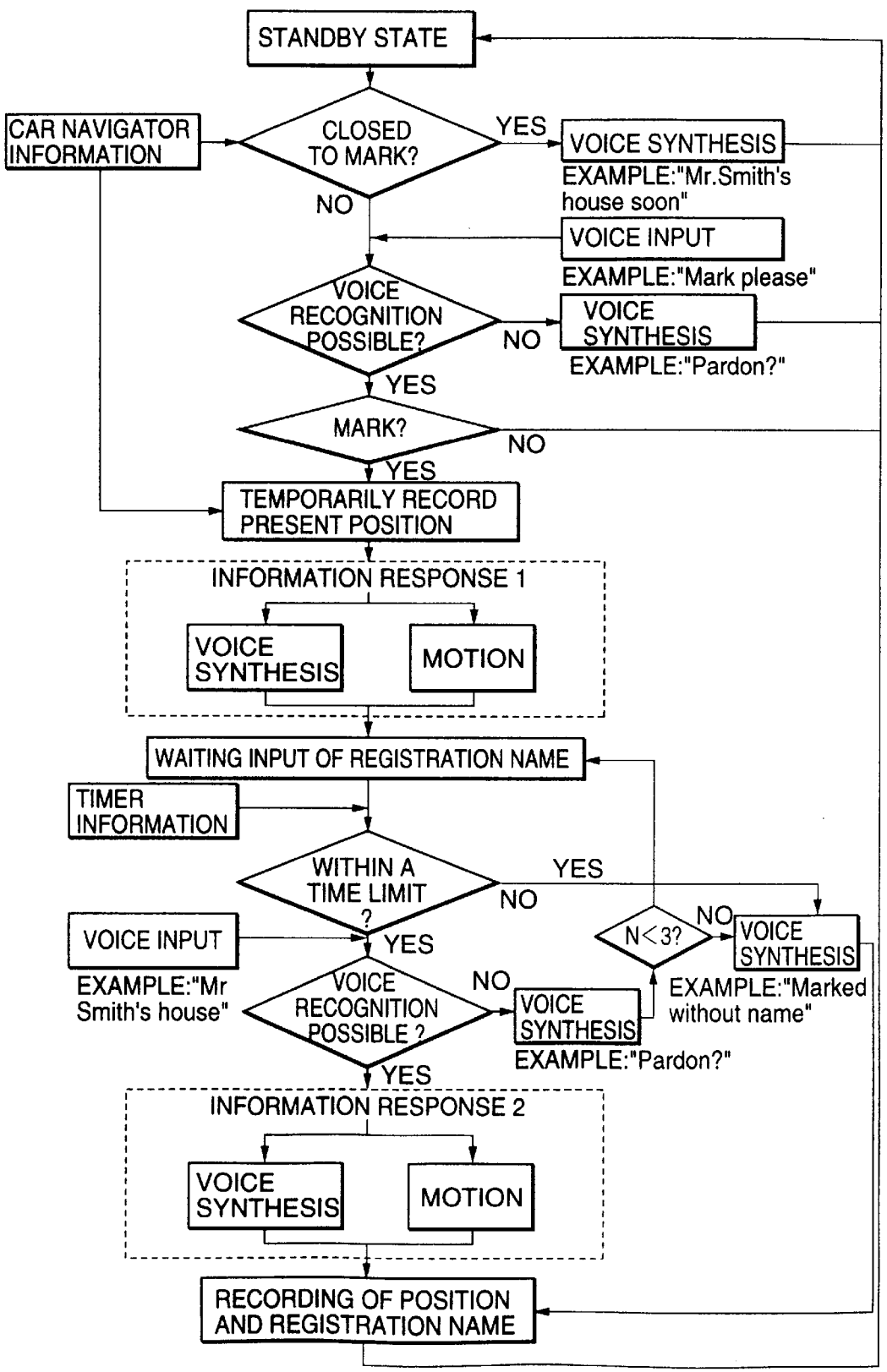
FIG. 39 is a flowchart useful for understanding a voice marker flow.
Figure 40A:
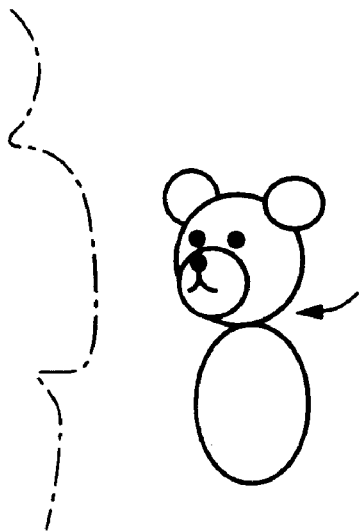
FIGS. 40(A)–40(B) are illustrations showing examples of motions of a doll.
Figure 40B:

FIG. 39 is a flowchart useful for understanding a voice marker flow. FIGS. 40(A)–40(B) are illustrations showing examples of motions of a doll. Here, it is assumed that a car navigation system, which is set up in a car loading the doll, is capable of including voice information in the landmark.

Here, car navigation information is referred to. When the car approaches the landmark, a voice of, for example, "We will arrive at Mr. Smith house soon", is generated through a voice synthesis. This is informed a driver.

On the other hand, in a situation that it is intended to set up a new landmark, a voice of "Mark please" is inputted from a driver and the voice is recognized. As it is recognized as a n instruction as to an application of the landmark, a location of the car at that time is temporarily recorded as a place to which the landmark is applied. Then the doll turns its head to the driver as shown in FIG. 40(A) and generates a voice of "Name please".

As a voice, which is capable of recognized, is inputted within a predetermined period of time and a predetermined number of times (here 3 times) of voice input, a doll nods as shown in FIG. 40(B) and generates a voice of, for example, "Mr. Smith house is marked" in accordance with the recognized voice data, and records the landmark in such a manner that the voice data such as "Mr. Smith house" is associated with the temporarily recorded landmark.

On the other hand, when no voice is inputted within a predetermined time, or a voice, which cannot be recognized, continues a predetermined number of times, a voice of "It has been marked without name" is generated and a landmark free from an association with the voice data.

Adoption of such an arrangement as mentioned above makes it possible for a driver to record the landmark to which voice data is applied on a hand free basis, without altering one's eyes and posture. And when the car approaches the landmark, it is possible to receive information of the landmark in the voice which is recorded by one's own self.

Figure 41:
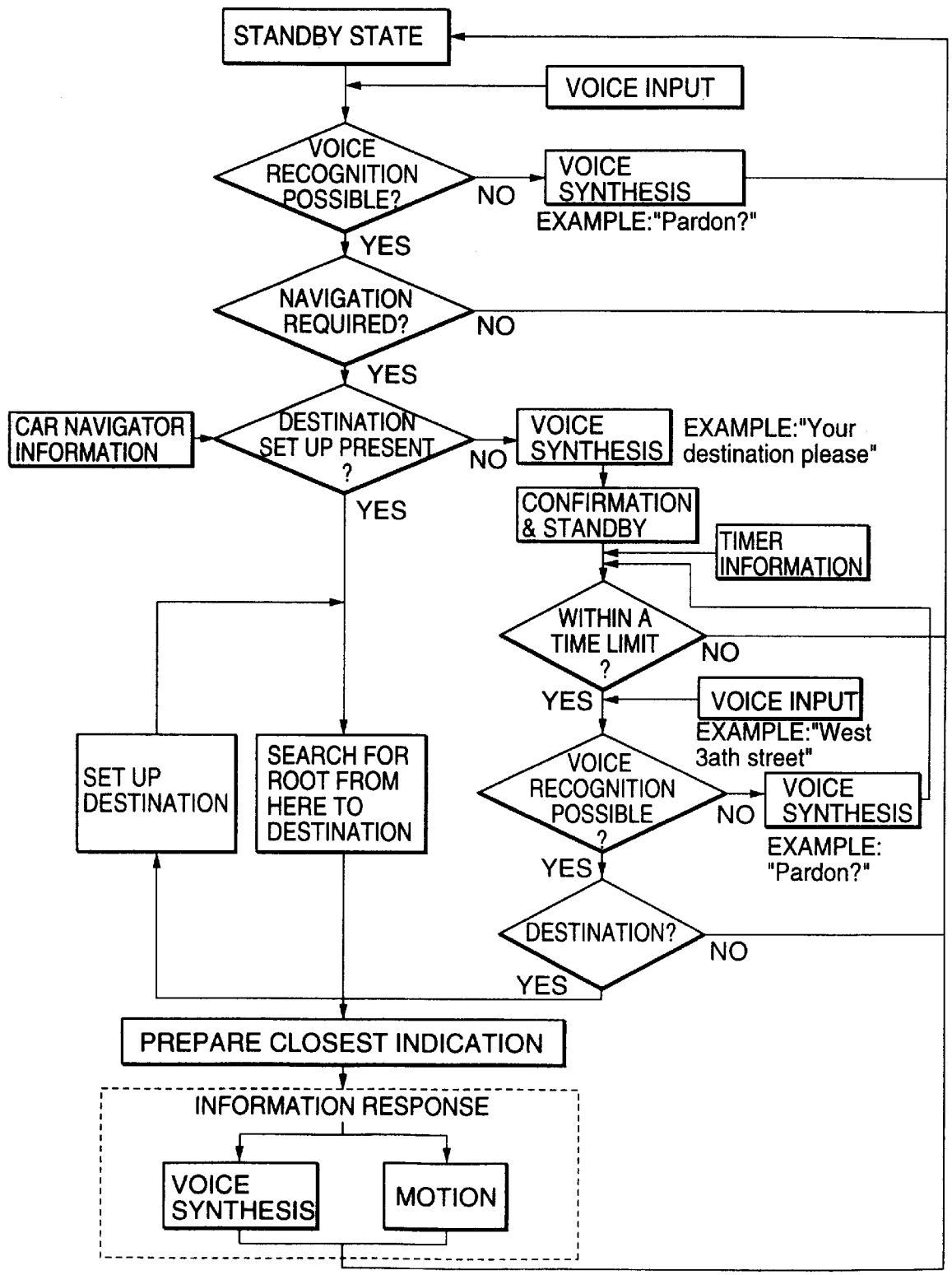
FIG. 41 is a flowchart useful for understanding a direction indication flow.
Figure 42:
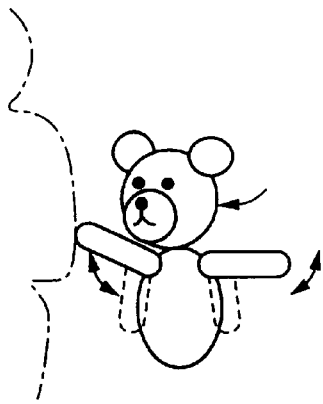
FIG. 42 is an illustration showing an example of motions of a doll.

FIG. 41 is a flowchart useful for understanding a direction indication flow. FIG. 42 is an illustration showing an example of motions of a doll.

Here, when a voice of "Navigate please" is inputted and recognized, it is interpreted that the navigation is required and navigation information is derived. When the destination is not set up, a voice of "Destination please" is generated. Thus, the a voice of, for example, "West $39^{th}$ Street" is inputted within a predetermined time limit, so that it is interpreted that the destination is inputted through the voice recognition. Then, the destination is set up to perform a search of a root from the place where one is now to the destination, so that information as to the closest direction indication to the destination is prepared. In the event that the destination has been set up, a process for set up of the destination is omitted, and there is performed a search of a root from the place where one is now to the destination.

As the closest direction indication to the destination is prepared, as shown in FIG. 42, the doll turns the head to a driver and moves both the hands up and down, and generates a voice of, for example, "Now, ΔΔ crossing, then turn left next crossing".

Thus, it is possible for a driver to undergo a car navigation service, while the driver concentrate one's attention on driving, in such a sense that as if the fellow passenger navigates, without looking at the screen of the car navigator.

Figure 43:
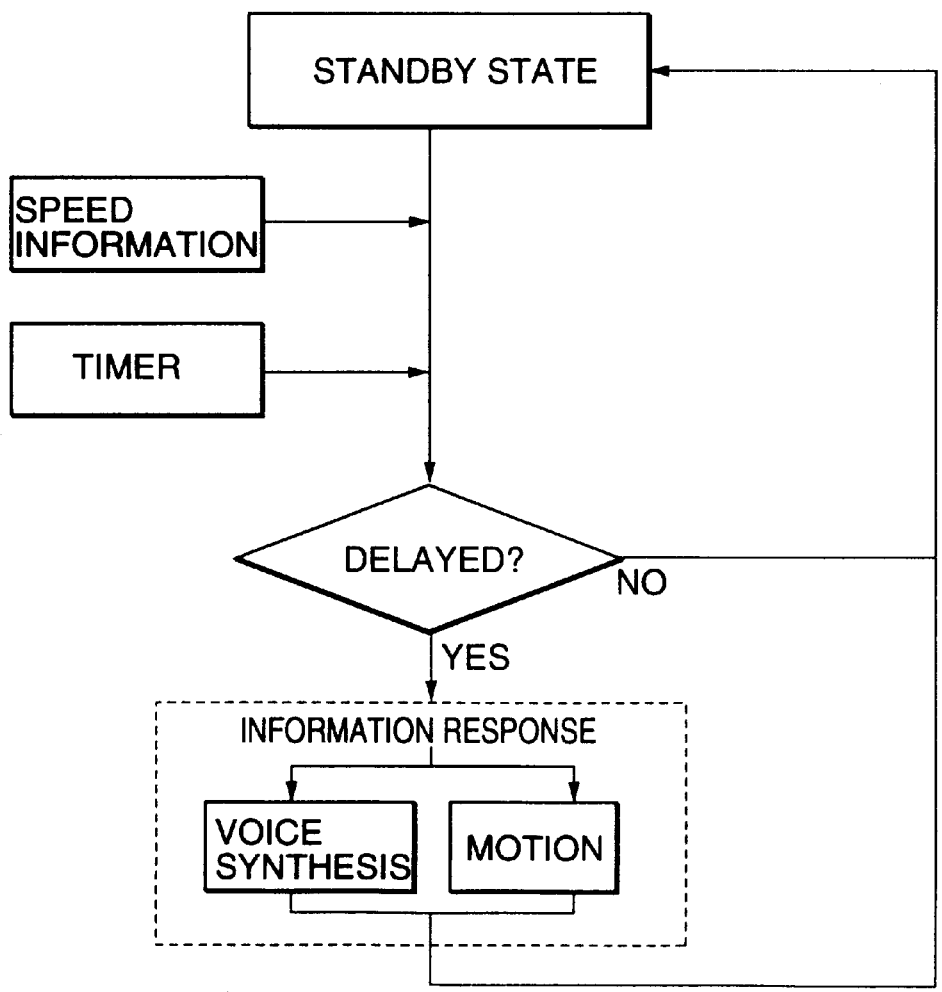
FIG. 43 is a flowchart useful for understanding a delay measure flow.
Figure 44:
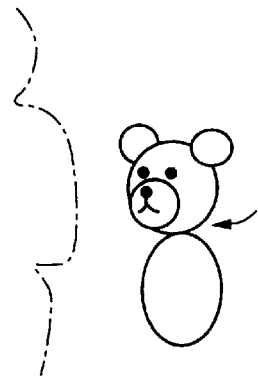
FIG. 44 is an illustration showing an example of motions of a doll.

FIG. 43 is a flowchart useful for understanding a delay measure flow. FIG. 44 is an illustration showing an example of motions of a doll.

When it is detected in accordance with speed information and timer information that a slow running of a car continues for some time, it is interpreted as the delay state. When the delay state is detected, as shown in FIG. 44, the doll turns the head to a driver and talks to the driver "It is delayed! Let's go slowly".

This feature makes it possible to soften a driver's dissatisfactory to the delay, and thus it is possible to expect a safe driving.

Figure 45:
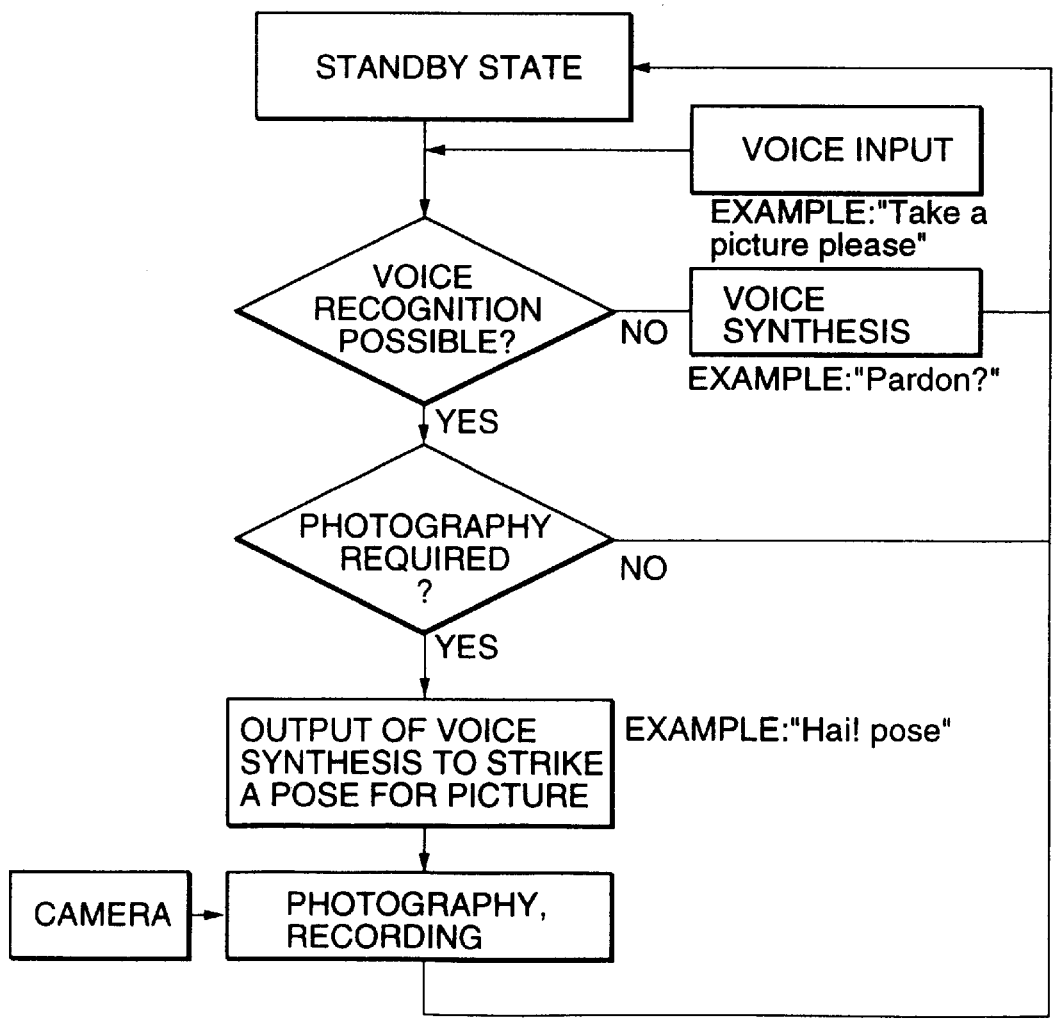
FIG. 45 is a flowchart useful for understanding a photography flow.

FIG. 45 is a flowchart useful for understanding a photography flow.

Here, as a voice of "Take a picture please" is inputted and it is interpreted through a voice recognition that a photography request is raised, a voice of, for example, "Hei! pose" is generated, and a CCD camera, which is incorporated into the doll, is automatically operated to perform a photography and/or a recording.

This feature makes it possible to perform a photography on a hands-free basis, even if a car is in motion.

Figure 46:
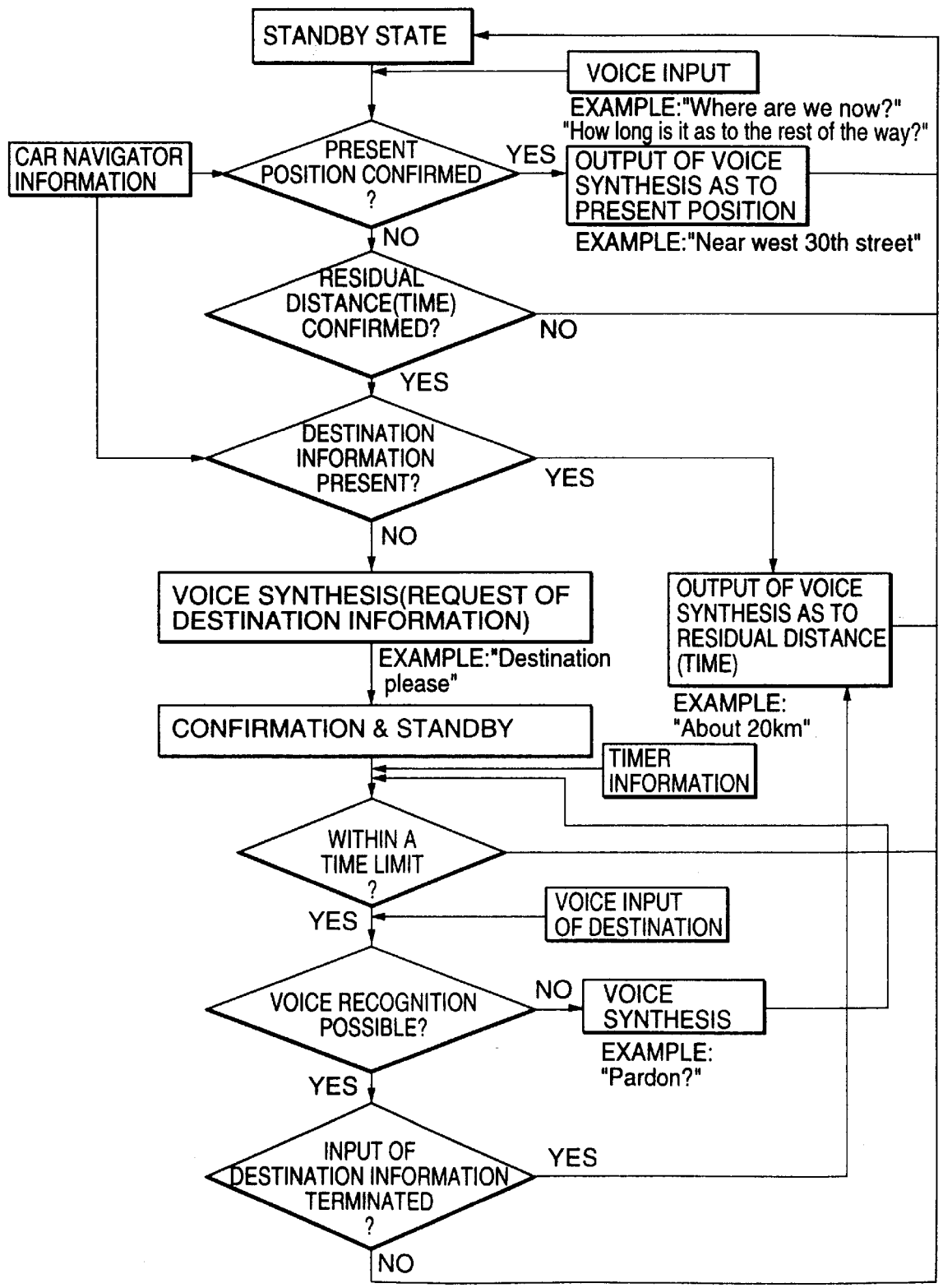
FIG. 46 is a flowchart useful for understanding a position/distance confirmation flow.
Figure 47:
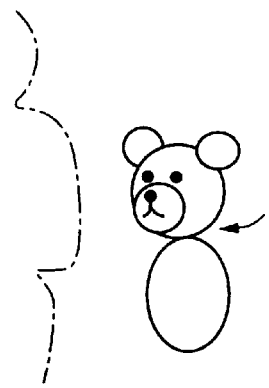
FIG. 47 is an illustration showing an example of motions of a doll.

FIG. 46 is a flowchart useful for understanding a position/distance confirmation flow. FIG. 47 is an illustration showing an example of motions of a doll.

Here, a voice of "Where now?" or "How long is it as to the rest?" is inputted and the question is interpreted through the voice recognition.

When the question is concerned with the confirmation of the place where one is now, information representative of the place where one is now is extracted from car navigation information, and the doll turns the head to a driver as shown in FIG. 47 and generates a voice of, for example, "Near West 35$^{th}$ Street".

On the other hand, when the question is concerned with the confirmation of the residual distance or the residual time to the destination, it is determined as to whether the car navigation information includes the destination information. When it is decided that the car navigation information includes the destination information, the doll turns the head to a driver as shown in FIG. 47 and generates a voice of, for example, "About 20 km", which is representative of the residual distance (or time) to the destination.

When it is decided that the car navigation information does not include the destination information, the doll turns the head to a driver and generates a voice of "Destination please". When a voice representative of the destination is inputted within a predetermined time limit and the voice is recognized, in a similar fashion to a case where the car navigation information includes the destination information from the first, the doll turns the head to a driver and generates a voice of, for example, "About 20 km", which is representative of the residual distance (or time) to the destination.

Thus, it is possible for a driver to confirm the place where one is now and know the residual distance (or time) to the destination, while the driver concentrate one's attention on driving, through a natural conversation in such a sense that as if the fellow passenger navigates, without looking at the screen of the car navigator.

Figure 48:
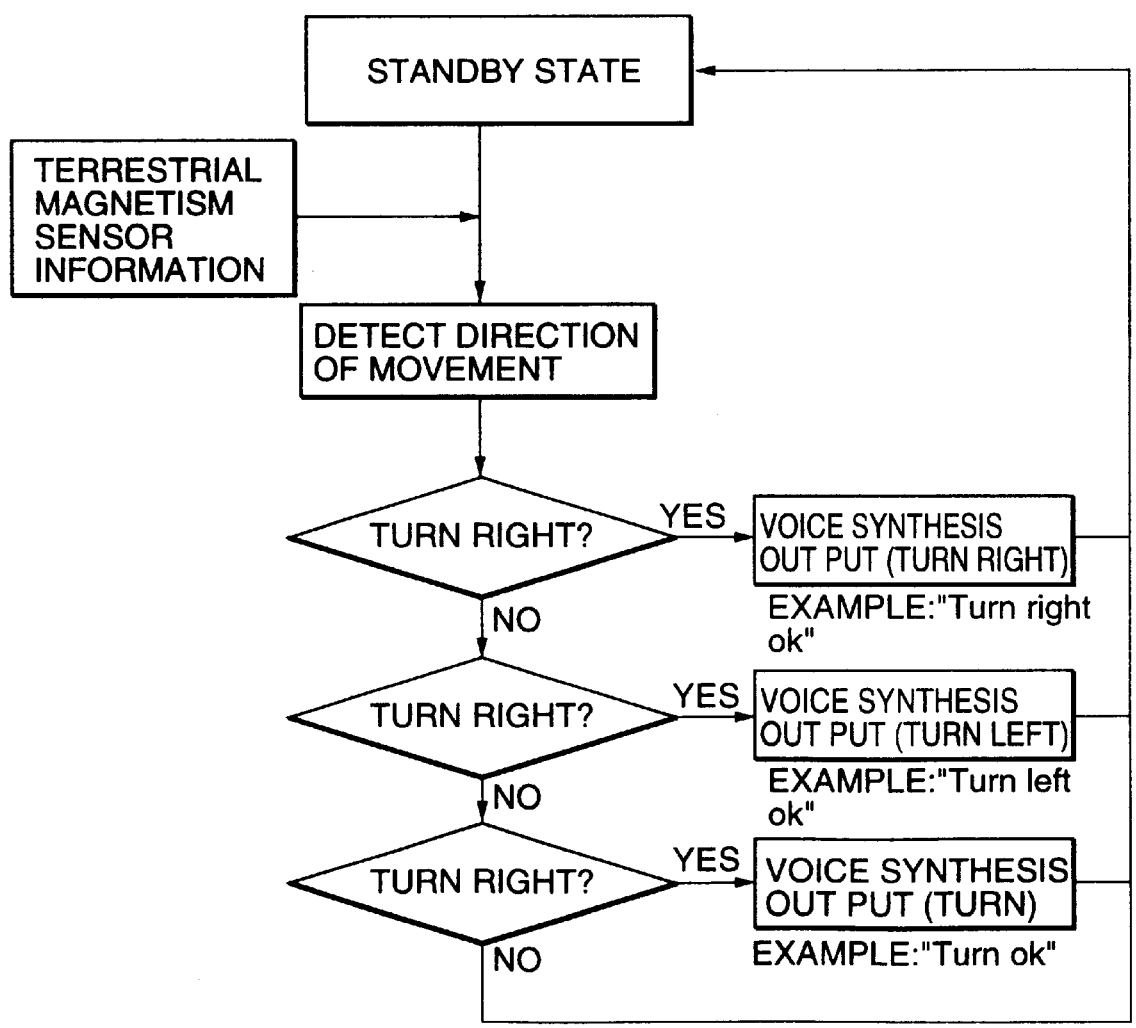
FIG. 48 is a flowchart useful for understanding a direction confirmation flow.

FIG. 48 is a flowchart useful for understanding a direction confirmation flow.

When a direction of movement is detected in accordance with information obtained by the terrestrial magnetism sensor and the turn-right, the turn-left or the turn occurs, a voice of "Turn-right OK?", "Turn-left OK?" or "Turn OK ?", is generated.

This feature makes it possible for a driver to have such a sense that there is a fellow passenger who understands the driving contents, and thus it is possible to expect a safe driving.

Figure 49:
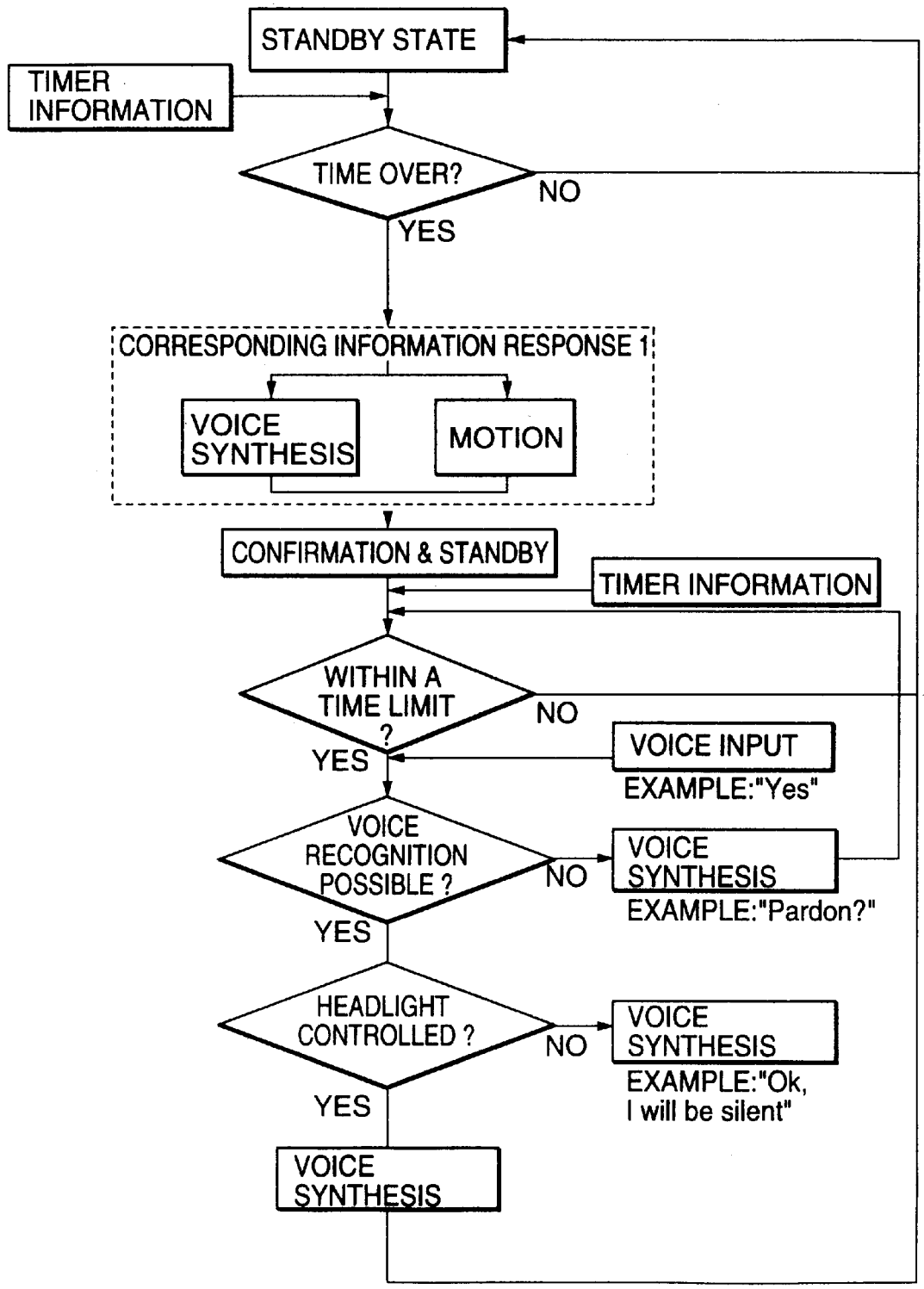
FIG. 49 is a flowchart useful for understanding a play flow.
Figure 50:
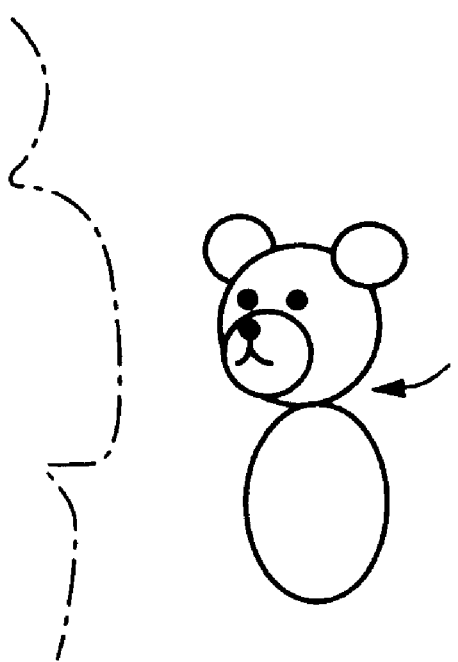
FIG. 50 is an illustration showing an example of motions of a doll.

FIG. 49 is a flowchart useful for understanding a play flow. FIG. 50 is an illustration showing an example of motions of a doll.

As it is detected that a predetermined time elapsed in accordance with timer information, as shown in FIG. 50, the doll turns the head to a driver and generates a voice of "Do you want to have a pun?". Thereafter, within a predetermined time limit, a voice of "Yes" or "No" is inputted and the voice is recognized. When the voice of "No" is recognized, a voice of "I will be silent" is generated and the process is terminated. On the other hand, when the voice of "Yes" is recognized, a voice data for a pun is reproduced so that a pun is outputted in a voice.

This feature makes it possible for a driver to be stimulated through the pun.

As mentioned above, according to the present invention it is possible to obtain various sorts of information through a natural conversation free from a feeling of wrongness or to perform various types of control.

Further, according to the present invention, it is permitted to register words, which were not able to be registered substantially in the form of commodities, since a mineral machine gives an operator (a driver) an unpleasant feeling, and it is possible to obtain car interior information which could not be recognized in accordance with the earlier technology. Furthermore, according to the present invention, even if a variety of words are defined for a single operation, an operator has no feeling of wrongness. Thus, it is possible to prepare a variety of words for a function which will be repeatedly utilized.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

TABLE 1

| No. | FIGS. | INPUT 1 | | | OUTPUT 1 | | | | | | | |
|---|---|---|---|---|---|---|---|---|---|---|---|---|
| | | VOICE RECOGNITION | SENSORS | ON-VEHICLE INFORMATION PROCESSING APPARATUS | VOICE | SERVO-X | SERVO-Y | SERVO-Z | SERVO-L | SERVO-R | CAMERS | ON-VEHICLE INFORMAITON PROCESSING APPARATUS |
| | | | | 1A | | | | | | | | |
| 1 | 5, 6 | Good morning! Hello! Name please Sing a song | | | Good morning! Hello! My name is Smith. Reproduce song data. | | 90, 45, 90 90, 45, 90 | | 90, 45, 90, 135 90, 45, 90, 135 | | 30, 128, 30 | | |
| | | Pun | | | Reproduce pun data. | | | | | | | |
| 2 | 7, 8 | | Acceleration | | Be careful! | | 90, 135, 90 | | | | | |
| | | | Acceleration | | Terrible! | | 90, 45, 90 | | | | | |
| | | | Acceleration (right/Left) | | Oh, no! | | 90, 135, 90/ 94, 45, 90 | | | | | |
| 3 | 9, 10 | Which? | Terrestrial Magnetism | | Looking the north. | 90, 135, 90 | | | | | | |
| 4 | 11, 12 | Turn on head light | Photo | Speed information Head light information | Light will be turned on. | | | | | | | Head light ON |
| | | Turn off head light | Photo | Speed information Head light information | Light will be turned off. | | | | | | | Head light OFF |
| | | | Photo, Timer | Speed information Head light information | Now in tunnel? To be turned ON? | | | 90, 45, 90 | | | | |
| | | | Photo, Timer | Speed information Head light information | Now light ON? To be turned OFF? | | | 90, 45, 90 | | | | |
| 5 | 15, 16 | | Timer | Speed information | Shall we rest? | 90, 135, 90 | | | | | | |
| | | (NO input for a long time) | Timer | | Let's play! | | | 90, 45, 90 | | 30, 128, 90128, 90, 30 30, 128, 90128, 90, 30 | | |
| 6 | 17, 18 | (No input for a long time) | Timer | Speed information | Are you sleeping? | 90, 135, 90 | | | | 30, 128, 90128, 90, 30 | | |

TABLE 1-continued

1B

| No. | FIGS. | EVENTS | VOICE RECOGNITION | INPUT 1 SENSORS | ON-VEHICLE INFORMATION PROCESSING APPARATUS | VOICE | SERVO-X | SERVO-Y | OUTPUT 1 SERVO-Z | SERVO-L | SERVO-R | CAMERS | ON-VEHICLE INFORMATION PROCESSING APPARATUS |
|---|---|---|---|---|---|---|---|---|---|---|---|---|---|
| 7 | 19, 20 | Drink-drive measures | | ODOR | | It smells like alcohol. Don't drive in drinking. | 90, 135, 90 | | | 30, 128, 30, 128 | 30, 128, 30, 128 | | |
| 8 | 21, 22 | Bad road measures | | Vibration | | Bad road. Be careful. | 90, 135, 90 | | | | | | |
| 9 | 23, 24 | TEMP/HUM confirmation | Temperature? Humidity? | Temperature Humidity | | 25° C. 70% | | 90, 45, 90 | | | | | |
| 10 | 25, 26 | TEMP Control | Hot! Down temperature | Temperature | | Hot? | 90, 135, 90 | | | | | | |
| 11 | 27, 28 | HUM Control | Cold! Up temperature | Temperature | | Cold? Temperature down? | 90, 135, 90 90, 135, 90 | | | | | | |
| | | | | Temperature Temperature | | Temperature up? | 90, 135, 90 | | | | | | |
| 12 | 29, 30 | Volume control | Down Volume Up Volume | | Audio volume information Audio volume information | Volume down? Volume up? | 90, 135, 90 90, 135, 90 | | | | | | |
| 13 | 31, 32 | Car interior light | Turn on/off room light | | Car interior light information | Room light ON/OFF | | | | | | | Car interior light ON/OFF |
| 14 | 33, 34 | Portable telephone | | | Portable telephone call incoming, speed information | Telephone call! | 90, 135, 90 | | | 30, 128, 90128, 90, 30 | | | |
| 15 | 35, 36 | Fuel efficiency confirmation | | | Fuel efficiency information | About 10 km per liter. | 90, 135, 90 | | | | | | |
| 16 | 37, 38 | Landmark information | Landmark | | Car navigation position, landmark information | Reproduce landmark information. | | | 90, 45, 90, 135 | | | | |
| 17 | 39, 40 | Voice marker | Mark please | | Temporarily record car navigation position | Name please. | 90, 135, 90 | | | | | | |
| | | | | | Car navigation position, voice maker information | Mr. Smith house soon. | 90, 135, 90 | | | | | | |

TABLE 1-continued

1C

| | | | | INPUT 1 | | | OUTPUT 1 | | | | | | |
|---|---|---|---|---|---|---|---|---|---|---|---|---|---|
| No. | FIGS. | EVENTS | VOICE RECOGNITION | SENSORS | ON-VEHICLE INFORMATION PROCESSING APPARATUS | VOICE | SERVO-X | SERVO-Y | SERVO-Z | SERVO-L | SERVO-R | CAMERS | ON-VEHICLE INFORMATION PROCESSING APPARATUS |
| 18 | 41, 42 | Direction indication | Navigate please | | Car navigation position, voice maker information | Now ΔΔ crossing, then turn left next crossing ○○. | 90, 135, 90 | | | 30, 128, 90 | 30, 128, 90128, 90, 30 | | |
| 19 | 43, 44 | Delay measures | | Timer | Speed information | It is delayed. Let's go slowly. | 90, 135, 90 | | | | | | |
| 20 | 45 | Photography | Take a picture | | | say cheese | | | | | | Photography | |
| 21 | 46, 47 | Position confirmation | Where now? | | Car navigation position information | Near West 30th Street | 90, 135, 90 | | | | | | |
| | | | How long is it as to the rest? | | Destination information | About 20 km | 90, 135, 90 | | | | | | |
| | | | How long is it as to the rest? | | No destination information | To where? | 90, 135, 90 | | | | | | |
| | | Distance confirmation | How long is it to West 35th Street? | | Car navigation position, destination information | About 6 km | 90, 135, 90 | | | | | | |
| 22 | 48 | Turn left or right Turn direction | Terrestrial magnetism Terrestrial magnetism | | | Turn left (right) OK? Turn OK? | | | | | | | |
| 23 | 49, 50 | Play | Timer | | | Do you want to have a pun? | 90, 135, 90 | | | | | | |

TABLE 2

| No. | INPUT 2 VOICE | INPUT 2 ON-VEHICLE INFORMATION PROCESSING APPARATUS | OUTPUT 2 VOICE | OUTPUT 2 SERVO-X(') | OUTPUT 2 SERVO-Y(') | OUTPUT 2 SERVO-Z(') | OUTPUT 2 ON-VEHICLE INFORMATION PROCESSING APPARATUS |
|---|---|---|---|---|---|---|---|
| | | | 2A | | | | |
| 1 | | | | | | | |
| 2 | | | | | | | |
| 3 | | | | | | | |
| 4 | OK | | Turn ON light | | | 90, 45, 90 | Head light ON |
| | OK | | Turn OFF light | | | | Head light OFF |
| 5 | | | | | | | |
| 6 | | | | | | | |
| 7 | | | | | | | |
| 8 | | | | | | | |
| 9 | | | | | | | |
| 10 | OK | | Down | 90, 135, 90 | | | SET TEMP Down |
| | OK | | Up | 90, 135, 90 | | | Set TEMP UP |
| 11 | OK | SET TEMP | Down | 90, 135, 90 | | | SET TEMP Down |
| | OK | SET TEMP | Up | 90, 135, 90 | | | SET TEMP UP |
| 12 | OK | Volume Information | Down | 90, 135, 90 | | | Volume Information Down |
| | OK | Volume Information | Up | 90, 135, 90 | | | Volume Information Up |
| | | | 2B | | | | |
| 13 | | | | | | | |
| 14 | "Answer the phone"/ "Hold"/"Message" | | Telephon function | | | | |
| 15 | | | | | | | |
| 16 | | | | | | | |
| 17 | Mr. Smith house | Marker recording | Marked Mr. Smith house | | 90, 45, 90 | | |
| 18 | | | | | | | |
| 19 | | | | | | | |
| 20 | | | | | | | |
| 21 | West 35th Street | Car Navigation position, destination information | About 5 km | 90, 135, 90 | | | |
| 22 | | | | | | | |
| 23 | OK | | Reproduce pun data | | | | |

What is claimed is:

1. An on-vehicle input and output apparatus, comprising:
   a head portion and a body portion;
   an information input unit receiving and interpreting vehicle environment information; and
   an information output unit outputting the interpreted vehicle environment information in conjunction with movement of said head portion and said body portion.

2. A method of providing vehicle environment information, comprising:
   receiving and interpreting vehicle environment information; and
   outputting the interpreted vehicle environment information in conjunction with movement of a head portion and a body portion of an on-vehicle input and output apparatus.

3. An on-vehicle input and output apparatus having a head portion and a body portion, comprising:
   an information input unit receiving input information in an on-vehicle environment;
   an information interpreter unit interpreting the input information received through said information input unit to generate output information; and
   an information output unit outputting the output information generated in said information interpreter unit, wherein said information output unit has a head motion mechanism for moving said head portion with respect to said body portion, and outputs the output information in such a manner that said head motion mechanism is used to move said head portion.

4. An on-vehicle input and output apparatus according to claim 3, wherein said information output unit has a voice output apparatus for outputting a voice, and outputs the output information through said voice output apparatus in form of voice.

5. An on-vehicle input and output apparatus according to claim 4, wherein said information output unit has a head motion mechanism for moving said head portion with respect to said body portion, and outputs the output information in such a manner that said head motion mechanism is used to move said head portion.

6. An on-vehicle input and output apparatus according to claim 5, wherein said information output unit has right and left arm portions, and an arm motion mechanism for moving said right and left arm portions with respect to said body portion, and said information output unit outputs the output information in such a manner that said arm motion mechanism is used to move said right and left arm portions.

7. An on-vehicle input and output apparatus according to claim 6, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

8. An on-vehicle input and output apparatus according to claim 5, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

9. An on-vehicle input and output apparatus according to claim 4, wherein said information output unit has right and left arm portions, and an arm motion mechanism for moving said right and left arm portions with respect to said body portion, and outputs the output information in such a manner that said arm motion mechanism is used to move said right and left arm portions.

10. An on-vehicle input and output apparatus according to claim 6, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

11. An on-vehicle input and output apparatus according to claim 4, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

12. An on-vehicle input and output apparatus according to claim 3, wherein said information output unit has right and left arm portions, and an arm motion mechanism for moving said right and left arm portions with respect to said body portion, and outputs the output information in such a manner that said arm motion mechanism is used to move said right and left arm portions.

13. An on-vehicle input and output apparatus according to claim 12, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

14. An on-vehicle input and output apparatus according to claim 3, wherein said information output unit has right and left arm portions, and an arm motion mechanism for moving said right and left arm portions with respect to said body portion, and outputs the output information in such a manner that said arm motion mechanism is used to move said right and left arm portions.

15. An on-vehicle input and output apparatus according to claim 14, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

16. An on-vehicle input and output apparatus according to claim 3, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

17. An on-vehicle input and output apparatus according to claim 3, wherein said information output unit has a transmitter apparatus for transmitting the output information to an equipment which alters in its state in accordance with information received, said equipment being set up in a car, and said information interpreter unit generates the output information to alter a state of said equipment in accordance with the input information received through said information input unit.

18. An on-vehicle input and output apparatus according to claim 3, wherein said information input unit has a microphone for picking up a voice, and said information interpreter unit has a voice recognition apparatus for recognizing a voice, and recognizes the voice to generate the output information.

19. An on-vehicle input and output apparatus according to claim 18, wherein said information input unit has a sensor for detecting a predetermined environment condition in an on-vehicle environment, and said information interpreter unit interprets the environment condition detected by said sensor to generate the output information.

20. An on-vehicle input and output apparatus according to claim 19, wherein said information input unit has a receiver apparatus for receiving information representative of a predetermined physical amount indicative of a state of a car, the predetermined physical amount being detected by a sensor set up in the car, and said information interpreter unit interprets the information received by said receiver apparatus to generate the output information.

21. An on-vehicle input and output apparatus according to claim 18, wherein said information input unit has a receiver apparatus for receiving information representative of a predetermined physical amount indicative of a state of a car, the predetermined physical amount being detected by a sensor set up in the car, and said information interpreter unit interprets the information received by said receiver apparatus to generate the output information.

22. An on-vehicle input and output apparatus according to claim 3, wherein said information input unit has a sensor for detecting a predetermined environment condition in an on-vehicle environment, and said information interpreter unit interprets the environment condition detected by said sensor to generate the output information.

23. An on-vehicle input and output apparatus according to claim 22, wherein said information input unit has a receiver apparatus for receiving information representative of a predetermined physical amount indicative of a state of a car, the predetermined physical amount being detected by a sensor set up in the car, and said information interpreter unit interprets the information received by said receiver apparatus to generate the output information.

24. An on-vehicle input and output apparatus according to claim 3, wherein said information input unit has a receiver apparatus for receiving information representative of a predetermined physical amount indicative of a state of a car, the predetermined physical amount being detected by a sensor set up in the car, and said information interpreter unit interprets the information received by said receiver apparatus to generate the output information.

25. An on-vehicle input and output apparatus according to claim 3, wherein said information input unit has a microphone for picking up a voice,
  said information interpreter unit interprets to receive a greeting through a voice recognition and generates output information representative of a responsive greeting to the greeting, and
  said information output unit outputs the output information in the form of at least one of voice and motion.

26. An on-vehicle input and output apparatus according to claim 3, wherein said information input unit has an acceleration sensor or a slope sensor,
  said information interpreter unit interprets the input information as one of a quick acceleration, an emergency brake, and an emergency handle, and generates an associated output information, and
  said information output unit outputs the output information in the form of at least one of voice and motion.

27. An on-vehicle input and output apparatus according to claim 3, wherein said information input unit has a terrestrial magnetism sensor collecting direction data and a microphone picking up a voice,
  said information interpreter unit interprets an inquiry as to a direction of movement of a car through a voice recognition and uses the direction data to generate output information representative of the direction of movement of the car, and
  said information output unit outputs the output information in the form of at least one of voice and motion.

28. An on-vehicle input and output apparatus according to claim 3, wherein said information input unit has a microphone for picking up a voice,
  said information interpreter unit interprets a car head light control instruction through a voice recognition and generates an associated output information, and
  said information output unit informs, in the form of at least one of voice and motion, of a matter that a head light is controlled, and transmits output information for a head light control to a head light control equipment.

29. An on-vehicle input and output apparatus according to claim 3, wherein said information input unit receives car speed information, timing information, and photo detector information for detecting luminance,
  said information interpreter unit uses the received information to interpret that a car is within a tunnel or out of the tunnel, by determining that a car is in motion and that a predetermined time elapses after a change in luminance is detected, and generate an associated output information, and
  said information output unit outputs the output information in the form of at least one of voice and motion.

30. An on-vehicle input and output apparatus according to claim 3, wherein said information input unit receives timer information and one of car speed information and vibration sensor information,
  said information interpreter unit uses the received information to interpret that a car is in a state of a continuous driving over a predetermined time and generate an associated output information, and
  said information output unit outputs the output information in the form of at least one of voice and motion.

31. An on-vehicle input and output apparatus according to claim 3, wherein said information input unit has a microphone picking up a voice, and said information input unit receives timer information and one of car speed information and vibration sensor information,
  said information interpreter unit uses the received information to interpret that a car is continuously driven over a predetermined time while no voice is input, and generate an associated output information, and
  said information output unit outputs the output information in the form of at least one of voice and motion.

32. An on-vehicle input and output apparatus according to claim 3, wherein said information input unit receives odor sensor information,
  said information interpreter unit interprets driving under the influence of liquor using the odor sensor information and generates an associated output information, and
  said information output unit outputs the output information in the form of at least one of voice and motion.

33. An on-vehicle input and output apparatus according to claim 3, wherein said information input unit receives vibration sensor information,
  said information interpreter unit interprets that a car is in motion on a bad road using the vibration sensor information and generates an associated output information, and
  said information output unit outputs the output information in the form of at least one of voice and motion.

34. An on-vehicle input and output apparatus according to claim 3, wherein said information input unit has a temperature sensor, and a microphone picking up a voice,
  said information interpreter unit interprets inquiries as to temperature of a car interior through a voice recognition, and generates an output information representative of temperature of the car interior, and
  said information output unit outputs the output information in the form of at least one of voice and motion.

35. An on-vehicle input and output apparatus according to claim 3, wherein said information input unit has a temperature sensor and a microphone for picking up a voice,
  said information interpreter unit determines in accordance with information from the temperature sensor as to whether a temperature of a car interior is within a suitable temperature limit, and when it is determined that the temperature of the car interior is out of the suitable temperature limit, and when an agreement of a temperature control is interpreted through a voice recognition, said information interpreter unit generates an associated output information, and
  said information output unit informs, in the form of at least one of voice and motion, of a matter that an air-conditioning control is performed, and transmits output information for an air-conditioning control to an on-vehicle air-conditioning control equipment.

36. An on-vehicle input and output apparatus according to claim 3, wherein said information input unit has a microphone for picking up a voice, said information interpreter unit interprets effective temperature information through a voice recognition and generates an associated output information, and said information output unit informs, in the form of at least one of voice and motion, of a matter that an air-conditioning control is performed, and transmits output information for an air-conditioning control to an on vehicle air-conditioning control equipment.

37. An on-vehicle input and output apparatus according to claim 3, wherein said information input unit has a microphone for picking up a voice, said information interpreter unit interprets auditory sense volume information through a voice recognition and generates an associated output information, and said information output unit informs, in the form of at least one of voice and motion, of a matter that a volume control for an on-vehicle audio equipment is performed, and transmits output information for a volume control for the on-vehicle audio equipment, to the on-vehicle audio equipment.

38. An on-vehicle input and output apparatus according to claim 3, wherein said information input unit has a microphone for picking up a voice, said information interpreter unit interprets an instruction as to a car interior lighting through a voice recognition and generates an associated output information, and said information output unit informs, in the form of at least one of voice and motion, of a matter that a control for a car interior lighting equipment is performed, and transmits output information for a car interior lighting equipment control to the car interior lighting equipment.

39. An on-vehicle input and output apparatus according to claim 3, wherein said on-vehicle input and output apparatus incorporates therein one of a portable telephone and a connection to a portable telephone, said information input unit has a microphone for picking up a voice, said information interpreter unit interprets an instruction as to a portable telephone control through a voice recognition and generates an output information for the portable telephone control, and said information output unit transmits output information for the portable telephone control to the portable telephone.

40. An on-vehicle input and output apparatus according to claim 3, wherein said information input unit has a microphone for picking up a voice, and receives information detected by a sensor for detecting a predetermined physical amount indicative of a state of a car, said sensor being set up in the car, said information interpreter unit interprets an inquiry as to the state of the car through a voice recognition, and generates an output information representative of the state of the car responding to the inquiry, and said information output unit outputs the output information in the form of at least one of voice and motion.

41. An on-vehicle input and output apparatus according to claim 3, wherein said on-vehicle input and output apparatus is connected to a car navigation system, said information input unit has a microphone for picking up a voice, and receives information obtained through said car navigation system, said information interpreter unit interprets an inquiry as to a navigation through a voice recognition, and generates an output information representative of a response to the inquiry, and said information output unit outputs the output information in the form of at least one of voice and motion.

42. An on-vehicle input and output apparatus according to claim 40, wherein said car navigation system connected to said on-vehicle input and output apparatus has a function that a landmark including a voice is applied, said information interpreter unit interprets an instruction of applying the landmark through a voice recognition, and generates an output information as to a control of applying the landmark to said car navigation system, and said information interpreter unit receives an input of a voice to be associated with the landmark from said microphone, and generates an output information representative of the voice to be associated with the landmark through a voice recognition, and said information output unit outputs the output information to said car navigation system.

43. An on-vehicle input and output apparatus according to claim 3, wherein said information input unit receives speed information of a car, said information interpreter unit interprets a delay of the car, and generates an associated output information, and said information output unit outputs the output information in the form of at least one of voice and motion.

44. An on-vehicle input and output apparatus according to claim 3, wherein said on-vehicle input and output apparatus has a camera, said information input unit has a microphone for picking up a voice, said information interpreter unit interprets an instruction as to a photography through a voice recognition, and generates an output information for a camera control, and said information output unit outputs the output information to said camera.

45. An on-vehicle input and output apparatus according to claim 3, wherein said information input unit has a terrestrial magnetism sensor, said information interpreter unit interprets a turn-right, a turn-left, or a turn of a car, and generates an associated output information, and said information output unit outputs the output information in the form of at least one of voice and motion.

46. An on-vehicle input and output apparatus according to claim 3, wherein said information input unit has one of a timer and a clock, said information interpreter unit interprets a time-up of the timer or an elapse of a predetermined time, and generates a predetermined output information, and said information output unit outputs the output information in the form of at least one of voice and motion.

47. An on-vehicle input and output apparatus according to claim 3, wherein said information input unit has a humidity sensor, and a microphone picking up a voice, said information interpreter unit interprets inquiries as to humidity of a car interior through a voice recognition, and generates an output information representative of humidity of the car interior, and said information output unit outputs the output information in the form of at least one of voice and motion.

* * * * *